(12) United States Patent
Kudo et al.

(10) Patent No.: US 7,100,086 B1
(45) Date of Patent: Aug. 29, 2006

(54) MICROCOMPUTER, ELECTRONIC EQUIPMENT AND DEBUGGING SYSTEM

(75) Inventors: Makoto Kudo, Fujimi-machi (JP); Yoichi Hijikata, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/424,667

(22) PCT Filed: Mar. 31, 1999

(86) PCT No.: PCT/JP99/01655
§ 371 (c)(1),
(2), (4) Date: Mar. 15, 2000

(30) Foreign Application Priority Data
Mar. 31, 1998 (JP) .......................... 10-103721

(51) Int. Cl.
*G06F 11/00* (2006.01)

(52) U.S. Cl. .......................... 714/30; 714/31
(58) Field of Classification Search .................. 714/28, 714/30, 31, 35
See application file for complete search history.

(56) References Cited

U.S. PATENT DOCUMENTS

| | | | | |
|---|---|---|---|---|
| 5,771,240 A | * | 6/1998 | Tobin et al. ................. | 714/724 |
| 6,145,123 A | * | 11/2000 | Torrey et al. ................ | 717/128 |
| 6,154,856 A | * | 11/2000 | Madduri et al. .............. | 714/27 |
| 6,185,522 B1 | * | 2/2001 | Bakker ........................ | 703/28 |
| 6,279,123 B1 | * | 8/2001 | Mulrooney ................... | 714/35 |
| 6,314,530 B1 | * | 11/2001 | Mann ........................... | 714/38 |
| 6,484,273 B1 | * | 11/2002 | Chang .......................... | 714/30 |
| 6,502,210 B1 | * | 12/2002 | Edwards ...................... | 714/38 |

FOREIGN PATENT DOCUMENTS

| | | |
|---|---|---|
| JP | 60-72034 | 4/1985 |
| JP | 63-303437 | 12/1988 |
| JP | 64-3745 | 1/1989 |
| JP | 1-286030 | 11/1989 |
| JP | 01-287752 | 11/1989 |
| JP | 02-264339 | 10/1990 |
| JP | 06-103104 | 4/1994 |
| JP | 8-221297 | 8/1996 |

OTHER PUBLICATIONS

IEEE Standard Test ACCESS Port and Boundry Scan Architecture, IEEE, 1993 IEEE Std 1149.1–1990.*
Isao Yoshida, "Function and Application of Ser. Port", Transistor Gijutsu, vol. 32, No. 10, Oct. 1, 1995, pp. 204–247 (w/partial English language translation of article).

* cited by examiner

*Primary Examiner*—Robert Beausoliel
*Assistant Examiner*—Bryce P. Bonzo
(74) *Attorney, Agent, or Firm*—Oliff & Berridge, PLC

(57) ABSTRACT

An object is to provide a microcomputer, electronic instrument and debugging system which can realize an on-chip debugging function through a reduced size of instruction code or a reduced circuit scale. A main monitor section (16) converts a debugging command into a primitive command. A mini monitor section (14) transfers data to and from the main monitor section (16) to execute a primitive command determined based on the receive data. The primitive commands include go, write and read commands. A control register having its address allocated on a memory map in the debugging mode is provided together with a mini monitor RAM. The mini monitor section (14) serving as a slave is connected to the main monitor section (16) serving as a master through a half-duplex bidirectional communication line so that transfer data can be fixed-length. The receive data includes a command identifying data. A mini monitor program has been stored in a ROM. The mini monitor section (14) and main monitor section (16) use a clock in common to generate a sampling clock while transferring data in the start-stop synchronization.

36 Claims, 28 Drawing Sheets

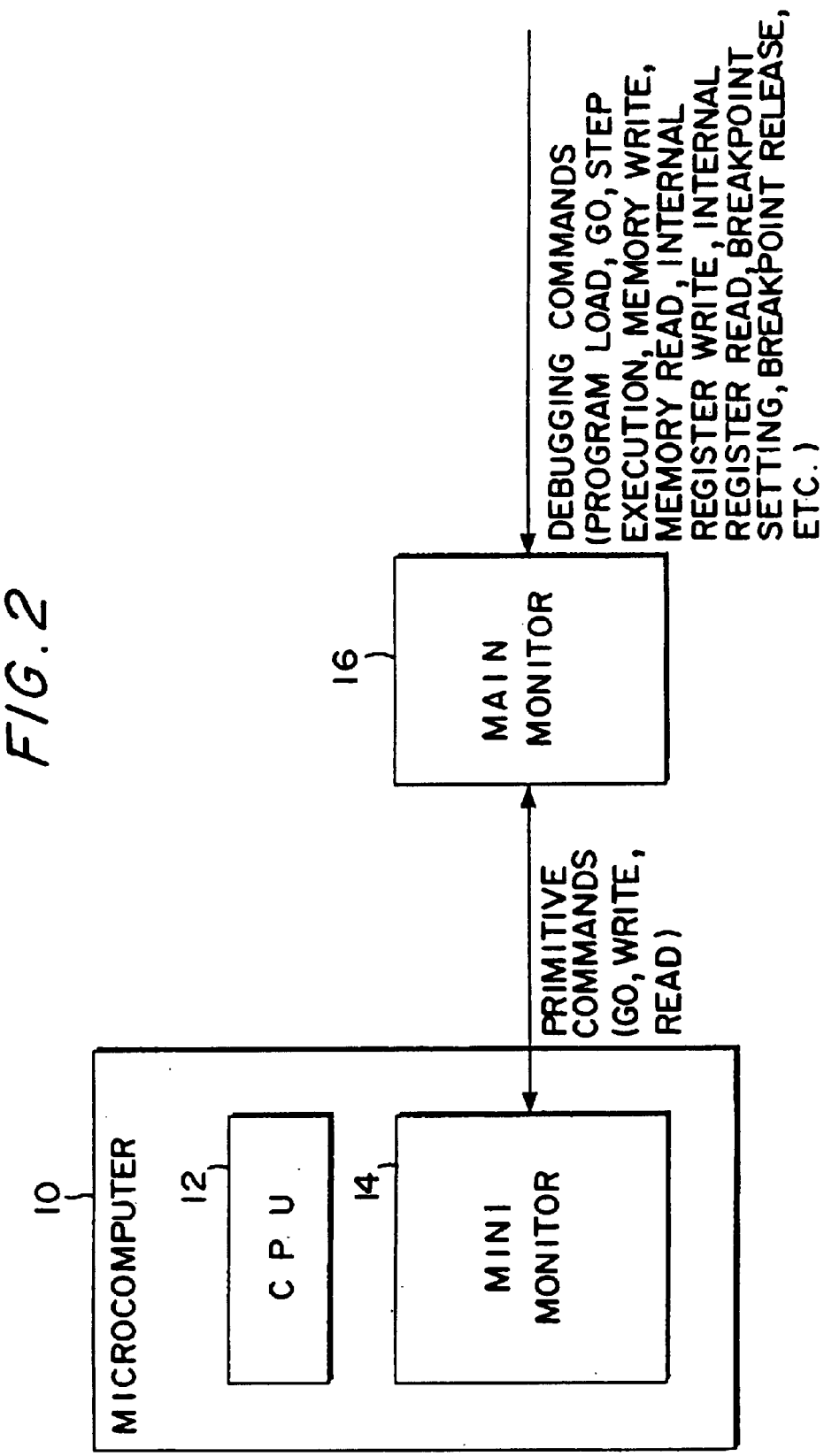

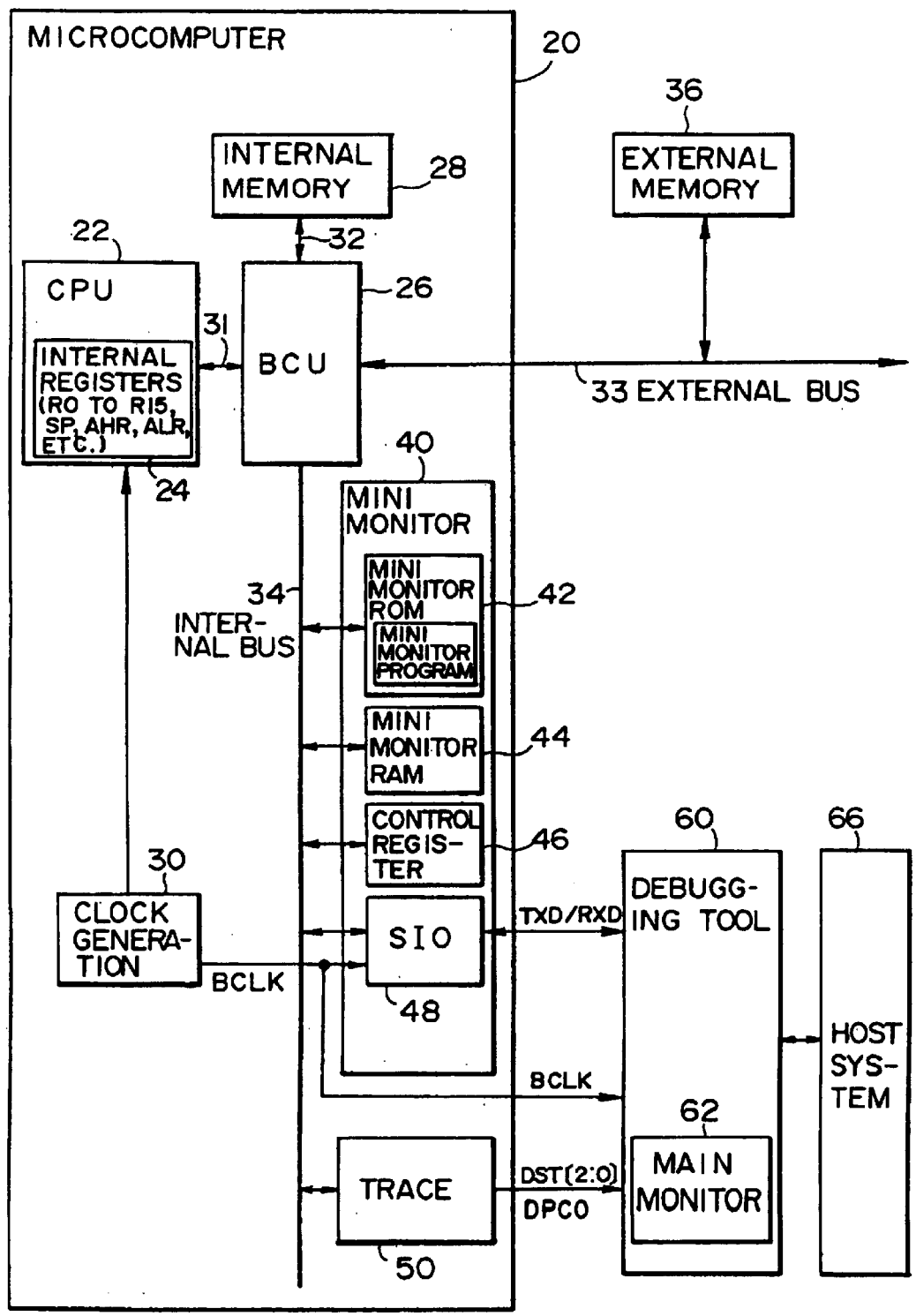

FIG. 5A  PROGRAM LOAD (80010h, 12 BYTES, ADD---, SUB---
AND---, OR---, XOR---, LD.W---)

⟹ WRITE(80010h, ADD---, SUB---)
  +WRITE(80014h, ADD---, OR---)
  +WRITE(80018h, XOR---, LD.W---)

FIG. 5B  STEP EXECUTION

⟹ WRITE TO STEP EXECUTION ENABLE BIT OF CONTROL REGISTER
  +GO

FIG. 5C  INTERNAL REGISTER READ

⟹ READ MONITOR RAM ON MEMORY MAP

FIG. 5D  BREAKPOINT SETTING

⟹ WRITE TO BREAK ENABLE BIT AND BREAK ADDRESS BIT OF CONTROL REGISTER

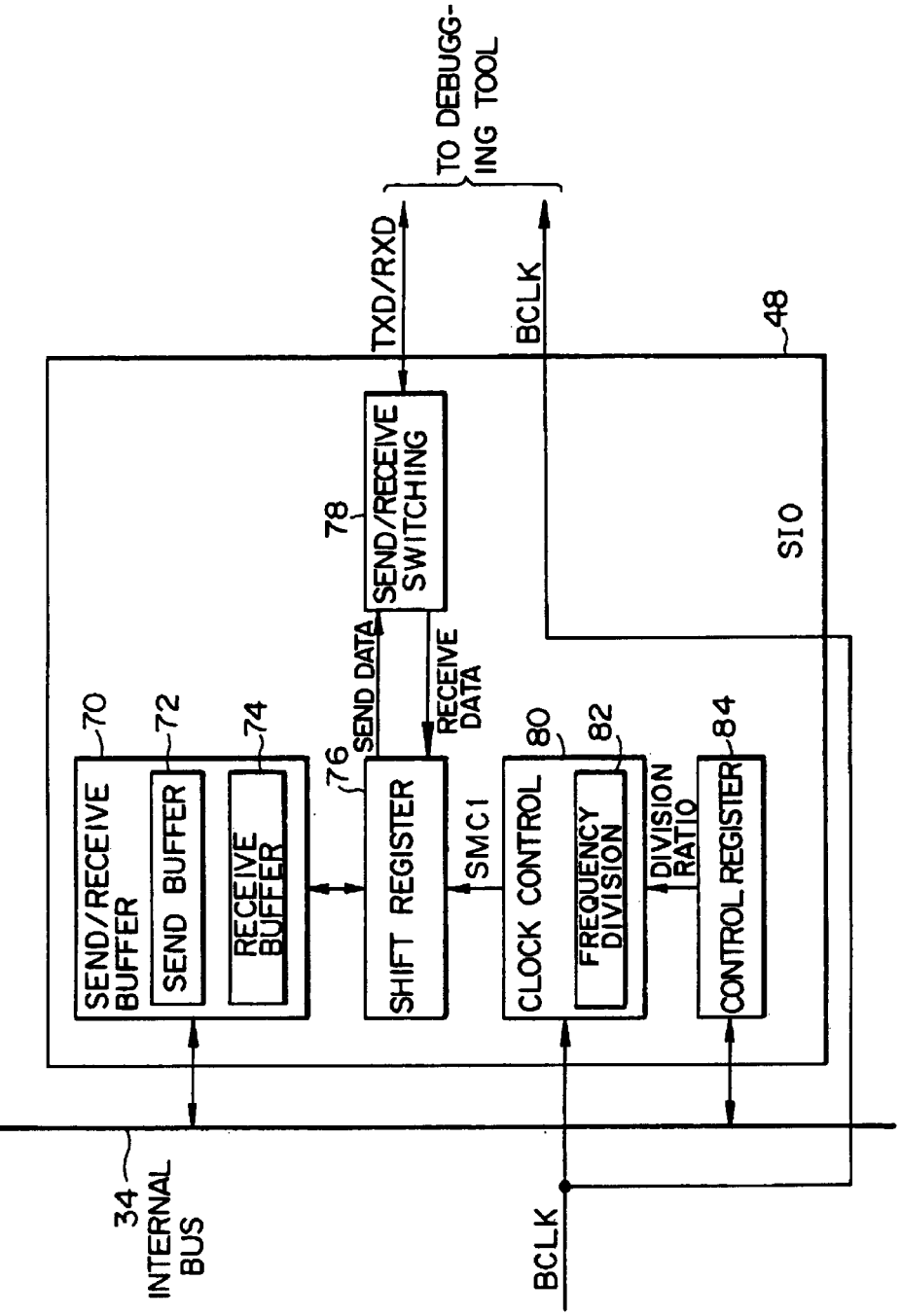

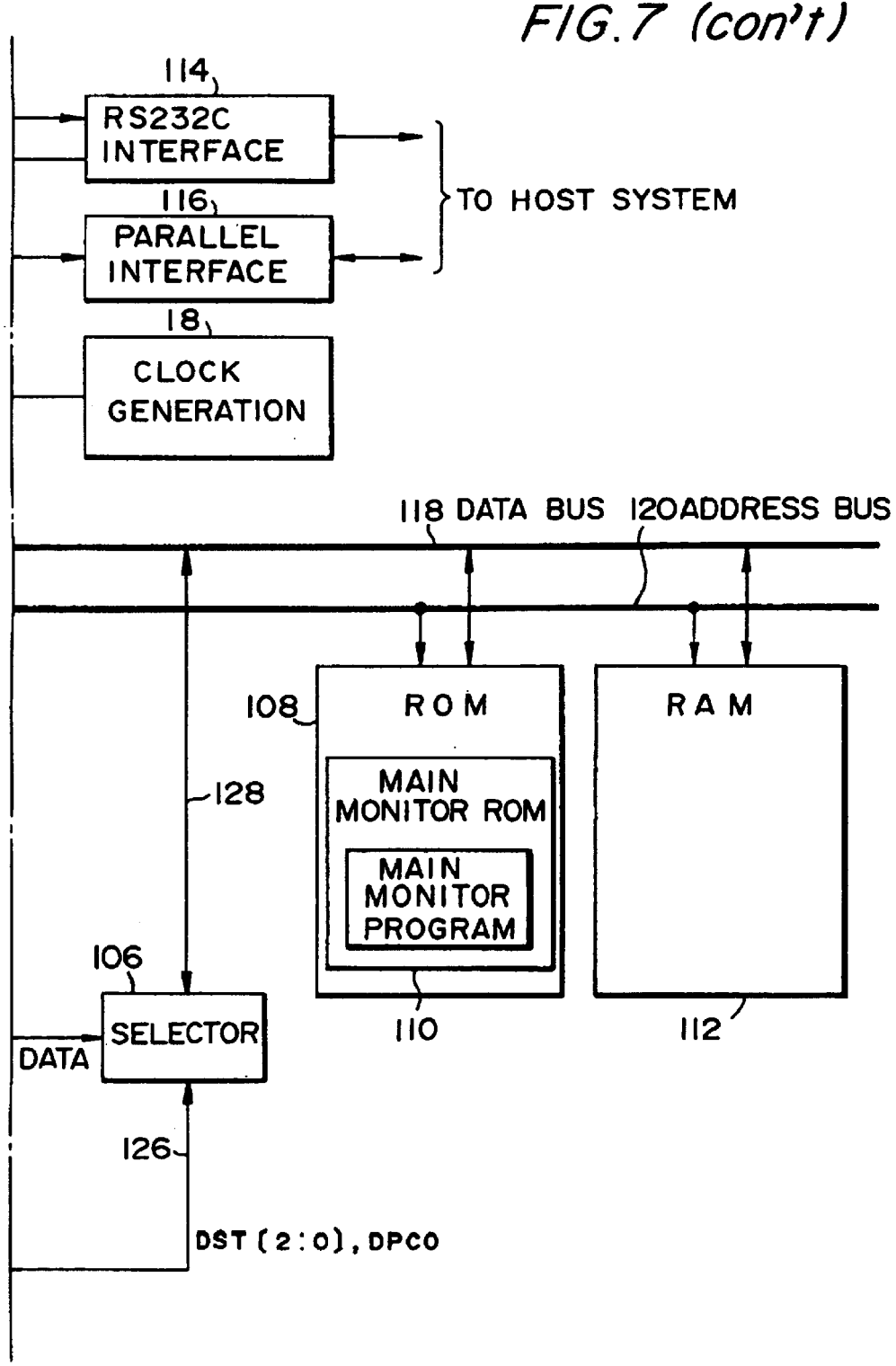
FIG. 7 (con't)

FIG. 10A  DATA FORMAT
| ID | 1 BYTE |
|---|---|
| DATA SIZE | 1 BYTE |
| ADDRESS | 4 BYTES |
| DATA 1 | 4 BYTES |
| DATA 2 | 4 BYTES |
} FIXED LENGTH DATA OF 14 BYTES
FIG. 10B  GO COMMAND
RECEIVE DATA
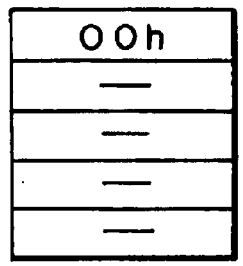
NO SEND DATA.
SHIFT TO EXECUTION
FIG. 10C  WRITE COMMAND
RECEIVE DATA
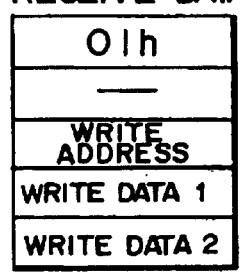
SEND DATA
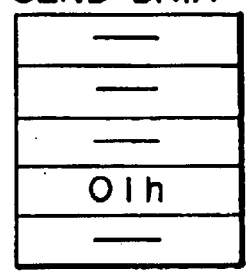
FIG. 10D  READ COMMAND
RECEIVE DATA
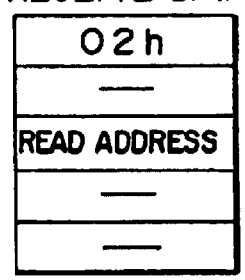
SEND DATA
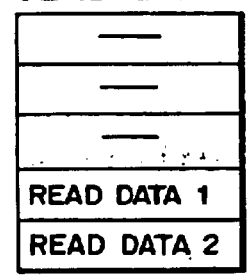

FIG. 11A

EXTERNAL ROUTINE JUMP COMMAND

RECEIVE DATA

| 03h | |
|---|---|
| 18h | (DATA FOR CHECKING MALFUNCTION) |
| %R12 | (ROUTINE ADDRESS) |
| %R13 | (WRITE DATA) |
| %R14 | (DATA ADDRESS) |

SEND DATA

| — | |
|---|---|
| — | |
| — | |
| %R10 | (RETURN VALUE, WHEN IT IS ZERO, PROGRAM NORMALLY TERMINATES) |
| — | |

FIG. 11B

DATA FILL COMMAND

RECEIVE DATA

| 04h |
|---|
| 1,2,4 |
| START ADDRESS |
| FILL NUMBER |
| FILL PATTERN |

SEND DATA

| — |
|---|
| — |
| — |
| 04h |
| — |

SOURCE CODE OF MINI MONITOR PROGRAM

VARIABLE LENGTH

SOURCE CODE OF MINI MONITOR PROGRAM

FIXED LENGTH

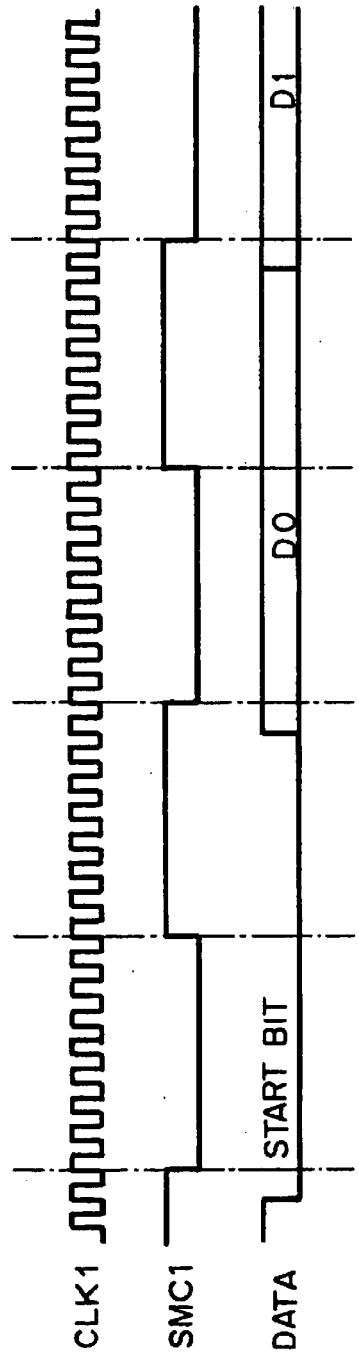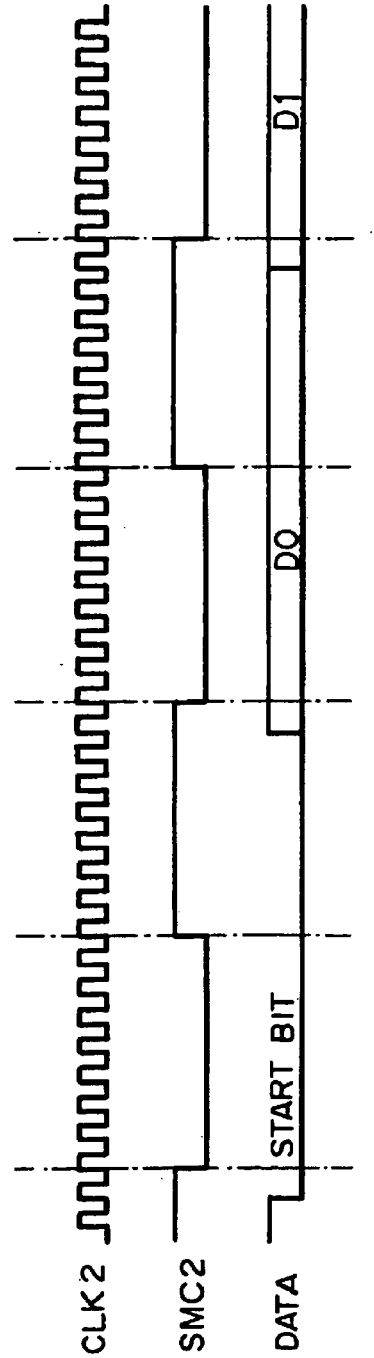

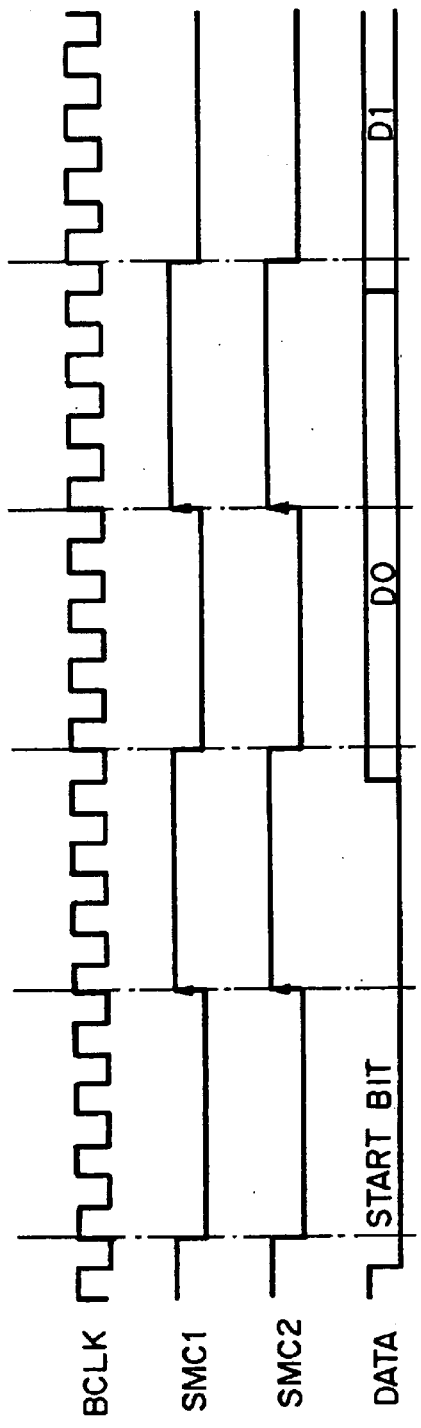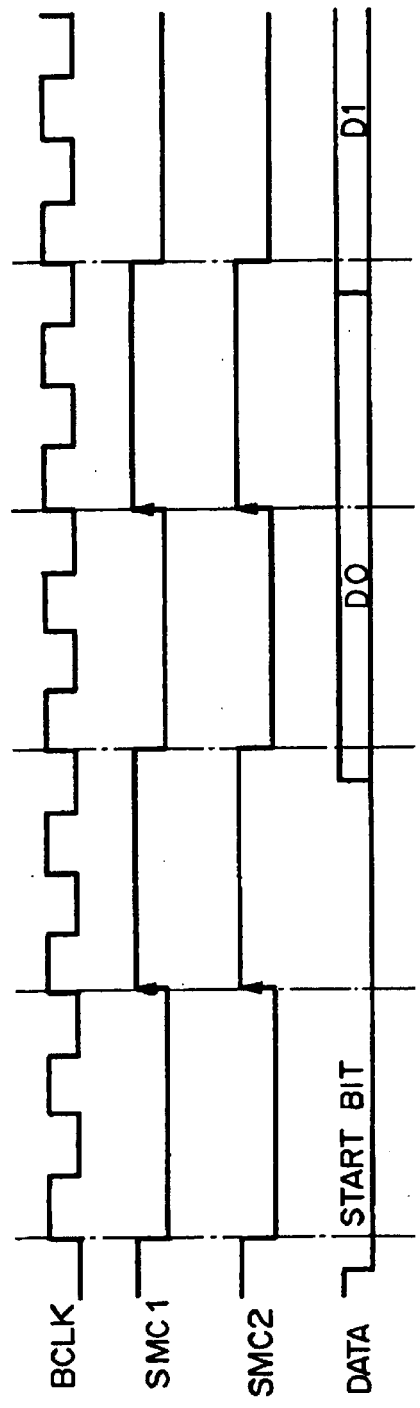

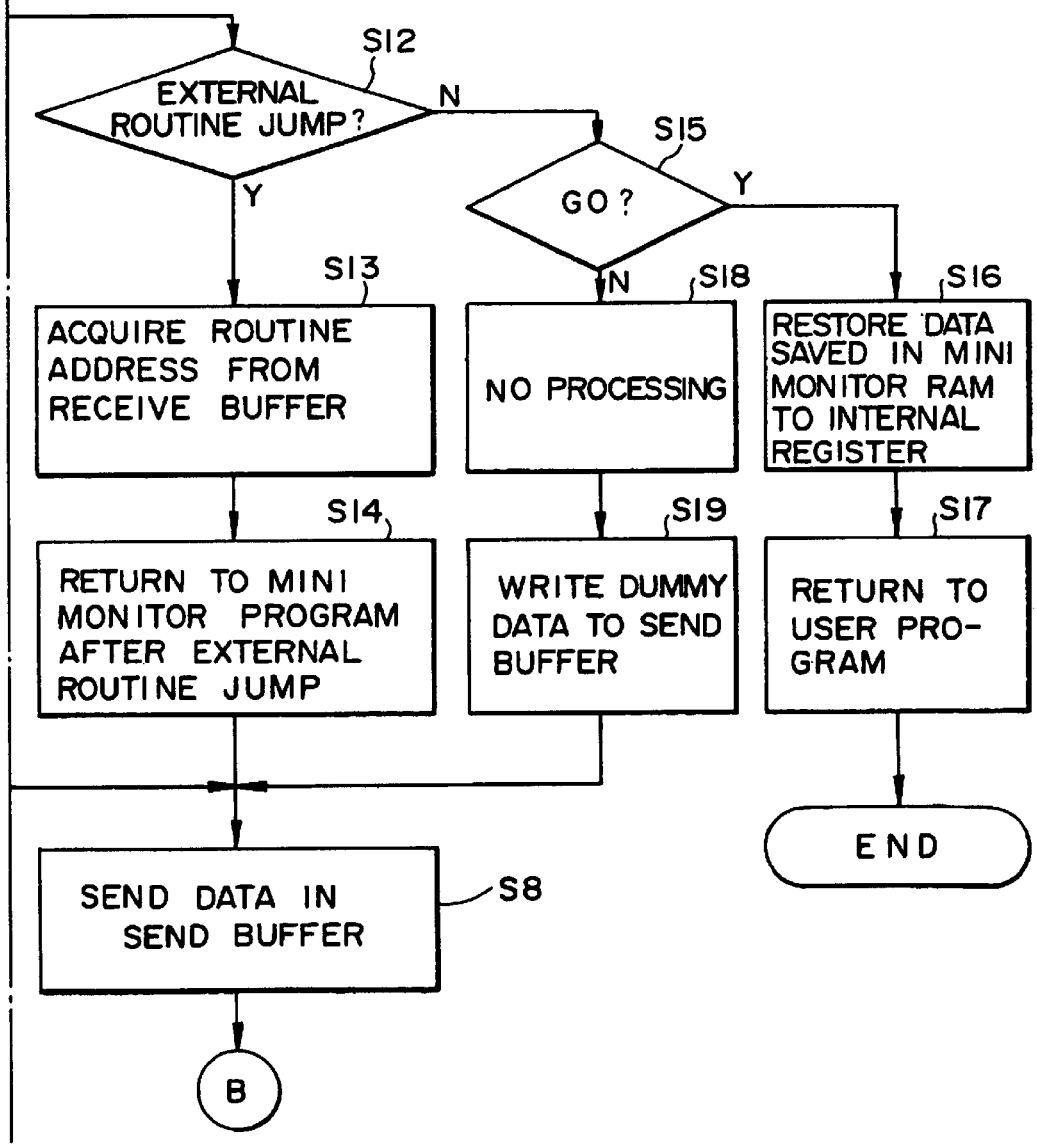
FIG.24 (con't)

MICROCOMPUTER, ELECTRONIC EQUIPMENT AND DEBUGGING SYSTEM

TECHNICAL FIELD

The present invention relates to a microcomputer and also to electronic equipment and a debugging system comprising the same.

BACKGROUND ART

There has recently been increasing demand for the incorporation of microcomputers that are capable of implementing high-level information processing into electronic equipment such as game machines, car navigation systems, printers, and portable information terminals. Such a thus-incorporated microcomputer is usually mounted on a user board called a target system. A software development support tool called an in-circuit emulator (ICE) is widely used for supporting the development of software to be used in the target system.

The CPU-switching (swapping) type of ICE shown in FIG. 1A is the most common type of this kind of ICE used in the art. With this CPU-switching ICE, a microcomputer 302 is removed from a target system 300 during debugging, and a probe 306 of a debugging tool 304 is connected thereto instead. This debugging tool 304 emulates the operation of the removed microcomputer 302. The debugging tool 304 can also perform various processes necessary for debugging.

However, this CPU-switching ICE has disadvantages in that there is a large number of pins on the probe 306 and also a large number of lines 308 of the probe 306. It is therefore difficult to emulate the operation of the microcomputer 302 at high frequencies (the limit is at approximately 33 MHz, by way of example). It is also difficult to design the target system 300. Furthermore, the operating environment of the target system 300 (signal timings and load conditions) changes between the situation when the microcomputer 302 is installed and operating as designed and the situation when the debugging tool 304 is emulating the operation of the microcomputer 302. This CPU-switching ICE also has problems in that, if a different microcomputer is used, even if it is a modified version thereof, it is necessary to use a debugging tool of a different design and a probe in which the numbers and positions of the pins are different.

A known method of solving these disadvantages of such the CPU-switching ICE is an ICE in which a monitor program 310 is mounted in a target system 312, as shown in FIG. 1B. However, such a monitor program mounting type ICE is required to have a function of executing all the debugging commands (program loading, go, step execution, reading/writing of memory, reading/writing of internal register and setting/release of breakpoint). This will highly increase the size of instruction code in the monitor program 310 (for example, 30 to 50 Kbytes). Thus, the memory area available for user is decreased and also the difference in system between debugging and non-debugging operation cause problems. In order to overcome the problem of FIG. 1B, there has been proposed an on-chip debugging method in which a monitor program is installed into the chip. However, this raises another problem in that the size of the chip must be increased when a monitor program having a large size of instruction code is mounted within the chip.

DISCLOSURE OF THE INVENTION

The present invention was devised in the light of the above technical concerns and has an objective thereof the provision of a microcomputer that can realize an on-chip debugging function through a reduced size of instruction code or a reduced scale of circuit, together with electronic equipment and a debugging system including the same.

To this end, the present invention provides a microcomputer having an on-chip debugging function, comprising a central processing unit for executing instructions; and a first monitor means for performing data transfer to and from a second monitor means, determining a primitive command to be executed based on the receive data from the second monitor means, and performing processing for execution of the determined primitive command, the second monitor means being provided outside the microcomputer for performing a processing to convert a debugging command into at least one primitive command.

According to the present invention, the second monitor means located outside of the microcomputer performs processing to convert (decompose) a debugging command issued from a host system or the like into a primitive command. The first monitor means then receives data from the second monitor means and performs a processing to execute a primitive command determined based on the received data. In the present invention, it is not required that the monitor program for executing a processing of the first monitor means has a complicated routine for executing the debugging commands. Therefore, the size of instruction code in the monitor program can greatly be reduced so that the on-chip debugging function can be realized by use of small-scaled hardware.

The present invention is also characterized by that the primitive command includes a command for starting an execution of a user program, a command for writing data to an address on a memory map in a debugging mode and a command for reading data from the address on the memory map. When the primitive commands are simplified in such a manner, the size of instruction code in the monitor program can further be reduced.

The present invention is further characterized by that it further comprises a control register used for execution of instructions in the central processing unit and having an address thereof allocated on a memory map in a debugging mode. Thus, it becomes possible to perform the debugging processing in the debugging mode using the control register. Therefore, the processing can be simplified with small-scaled hardware.

The present invention is further characterized by a monitor RAM into which contents of an internal register of the central processing unit are saved, and having an address thereof allocated on a memory map in a debugging mode. Thus, the contents in the internal register can be read out during the debugging mode. Therefore, the debugging function can be diversified.

The present invention is further characterized by comprising a terminal connected to a single bidirectional communication line for performing a half-duplex bidirectional communication between the terminal and the second monitor means, and on condition that the first monitor means being a slave has received data from the second monitor means being a master, the first monitor means performs a processing corresponding to the received data and sends response data corresponding to the received data to the second monitor means. Thus, the number of terminals (pins) in the microcomputer can be reduced so that the microcomputer can be manufactured with a reduced cost. In addition, the communication protocol between the first and second monitor means can be simplified so that the size of instruction code in the monitor program can further be reduced.

The present invention is further characterized by that the data received from the second monitor means includes an identification data of the primitive command to be executed by the first monitor means. Thus, an instruction for execution of the primitive command can more easily be transmitted from the second monitor means to the first monitor means.

The present invention is further characterized by that the first monitor means transfers fixed-length data to and from the second monitor means. Thus, the size of instruction code in the monitor program of the first monitor means can still further be reduced.

The present invention is further characterized by that a monitor program for executing a processing of the first monitor means is stored in a ROM. Thus, the monitor program is stored in the ROM having its occupying area smaller than that of the RAM so that a logic circuit or the like for loading the monitor program into the RAM will not be required. Therefore, the microcomputer can further be scaled down.

The present invention is further characterized by that the first monitor means comprises a first frequency division circuit for dividing a first clock and for generating a first sampling clock for sampling each bit in data sent and received according to start-stop synchronization; and a circuit for sending and receiving data based on the first sampling clock, and the first monitor means supplies the first clock to the second monitor means as a signal for causing a second frequency division circuit included in the second monitor means to generate a second sampling clock. Thus, the first and second monitor means share the first clock for generating the sampling clock. This can highly reduce the rate of sampling error occurrence in the communication data with the communication speed being optimized and improved.

The present invention is further characterized by that the first monitor means includes a monitor RAM which is readable and writable, and when a break of an execution of an user program occurs and a mode is shifted to a debugging mode, the first monitor means saves a program counter value of the central processing unit and contents of an internal register into the monitor RAM. Thus, the user program can be properly executed when the procedure is returned from the debugging mode to the user program execution mode. Further, the first monitor means can utilize the contents of the internal register to perform various processings.

The present invention further provides electronic equipment comprising a microcomputer as mentioned above, an input source of data to be processed by the microcomputer, and an output device for outputting data processed by the microcomputer. Thus, the debugging operation for a program of the electronic equipment can more efficiently be performed. This can shorten time required to develop the electronic equipment and reduce the manufacturing cost thereof.

The present invention further provides a debugging system for a target system including a microcomputer, the debugging system comprising second monitor means for performing processing for converting a debugging command issued by a host system into at least one primitive command; and first monitor means for performing data transfer to and from the second monitor means, determining a primitive command to be executed based on the receive data from the second monitor means, and performing processing for execution of the determined primitive command.

According to the present invention, the size of instruction code in the monitor program for executing the processing in the first monitor means can highly be reduced. Thus, the memory area freely used by the user can be increased. Therefore, there can be provided a debugging system which can debug the target system in the same circumstance as in that of the actual operation.

BRIEF DESCRIPTION OF THE DRAWINGS

FIG. 1A is a view illustrating a CPU-switching ICE while

FIG. 2 is a view illustrating a characteristics of an embodiment of the present invention.

FIG. 3 is a functional block diagram of an example of the structure of the microcomputer and debugging system of this embodiment.

FIGS. 5A to 5D illustrate the processing involved in the conversion (decomposition) of debugging commands into primitive commands.

FIG. 6 is a functional block diagram of an example of the structure of SIO.

FIGS. 10A to 10D illustrate formats and types of send/receive data.

FIGS. 11A and 11B also illustrate formats and types of send/receive data.

FIGS. 15A and 15B illustrate timing waveforms of clock, sampling clock and sampling data in the general start-stop synchronization.

FIGS. 19A and 19B illustrate timing waveforms of clock, sampling clock and sampling data in the method of FIG. 18.

BEST MODE FOR CARRYING OUT THE INVENTION

A preferred embodiment of the present invention will now be described in detail with reference to the drawings.

1. Characteristics of this Embodiment

The features of this embodiment will first be described with reference to FIG. 2.

Referring to FIG. 2, a microcomputer 10 according to the embodiment of the present invention comprises a central processing unit (CPU) 12 and a mini monitor section (first monitor means) 14 that is the primary part of this embodiment. Outside the microcomputer 10 is provided a main monitor section (second monitor means) 16 which performs processing to convert (decompose) a debugging command issued by a host system, for example, into a primitive command. The mini monitor section 14 transfers data to and from the main monitor section 16. The mini monitor section 14 determines the primitive command to be executed based on the data received from the main monitor section and performs the processing to execute the primitive command.

The debugging commands to be converted by the main monitor section 16 may include commands such as program load, go, step execution, memory write, memory read, internal register write, internal register read, breakpoint setting, breakpoint release. The main monitor section 16 converts one of these various complicated debugging commands into a simple and primitive command such as go, write (a write to a given address on the memory map, when in the debugging mode) or read (a read from a given address on the memory map). Thus, the size of instruction code in a mini monitor program for executing the mini monitor section 14 can greatly be reduced. This enables the microcomputer 10 to realize its on-chip debugging function.

Figure 1A:
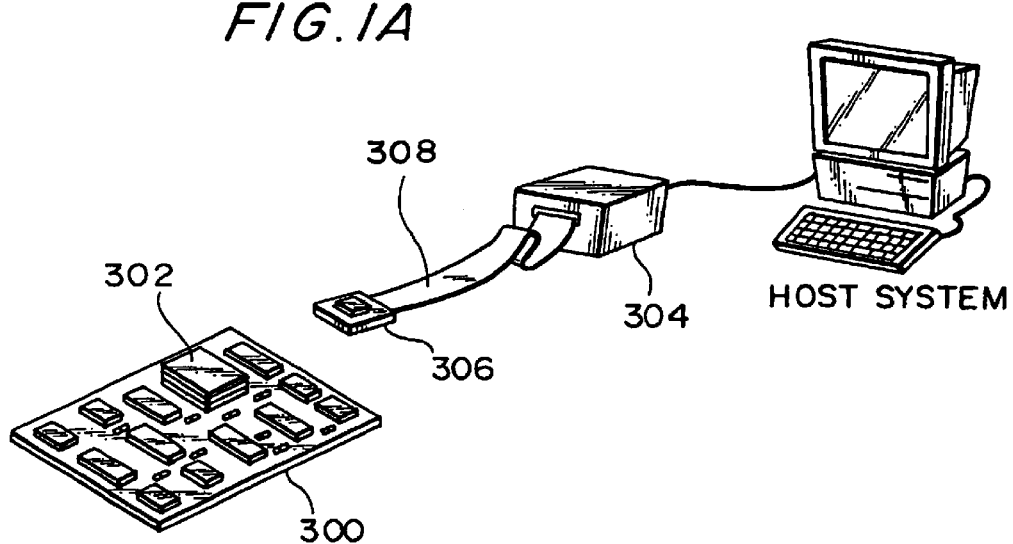
Figure 1B:
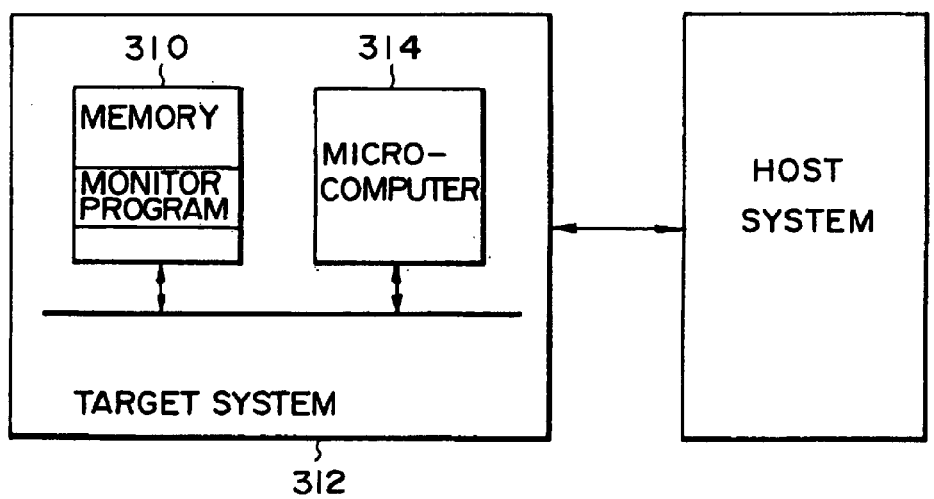
FIG. 1B is a view illustrating a monitor-program mounting ICE.

More particularly, in such an ICE as shown in FIG. 1B, the monitor program 310 has a routine for processing all the debugging commands such as program load, go, step execution and other commands. Thus, the size of instruction code in the monitor program 310 is very large (for example, 30 to 50 Kbytes). Accordingly, it is in fact difficult to install the monitor program 310 in the microcomputer 314.

On the contrary, this embodiment provides a mini monitor program for performing the processing of the mini monitor section 14, which has a processing routine containing simple primitive commands such as go, write, and read. Thus, the size of instruction code is very small (e.g., 256 bytes). Accordingly, the mini monitor program can be installed in the microcomputer 10 to realize the on-chip debugging function. It is further possible to restrain any reduction of the memory area that can freely be used by the user, to a minimum or even zero.

2. Detailed Structural Example

FIG. 3 shows the detailed example of the structure of a microcomputer and debugging system of this embodiment. Referring to FIG. 3, the microcomputer 20 comprises a CPU 22, a BCU (Bus Control Unit) 26, an internal memory (internal ROM and RAM other than a mini monitor ROM 42 and mini monitor RAM 44), a clock generation section 30, a mini monitor section 40 (first monitor means) and a trace section 50.

CPU 22 executes various instructions and includes an internal register 24. The internal register 24 includes general-purpose registers R0 to R15. The internal register 24 also includes registers SP (stack-pointer register), an AHR (higher register for data resulting from a sum-of-products), and an ALR (lower register for data resulting form the sum-of-products), which are special registers.

BCU 26 controls various buses such as a Harvard architecture bus 31 connected to the CPU 22, a bus 32 connected to the internal memory 28, an external bus 33 connected to an external memory 36 and an internal bus 34 connected to the mini monitor section 40, trace section 50 and others.

The clock generation section 30 generates various clocks which will be used in the microcomputer 20. BCLK from the clock generation section 30 is also supplied to an external debugging tool 60.

The mini monitor section 40 includes a mini monitor ROM 42, a mini monitor RAM 44, a control registers 46 and a SIO 48 (serial input/output).

The mini monitor ROM 42 has stored a mini monitor program. In this embodiment, the mini monitor program executes only simple primitive commands such as go, read, and write. Thus, the capacity of the mini monitor ROM 42 can be suppressed, for example, to about 256 bytes. Consequently, the microcomputer 20 can be reduced in scale while still retaining an on-chip debugging function.

At a transition to the debugging mode (when a break occurs in the user program), the contents of the internal register 24 in the CPU 22 are saved into the mini monitor RAM 44. Thus, the user program can properly be re-started after termination of the debugging mode. Furthermore, reading and the manipulation of the contents of the internal register can be implemented by a primitive read command in the mini monitor program, for example.

The control register 46 is a register for controlling various debugging processings and includes step execution enable bit, break enable bit, break enable address bit, trace enable bit and the like. These debugging processings can be realized when the mini monitor program operates the CPU 22 to write/read data to or from the respective bits in the control register 46.

SIO 48 sends and receives data between the SIO 48 and the debugging tool 60 that is provided outside of the microcomputer 20. SIO 48 is connected to the debugging tool 60 through TXD/RXD (data transfer line).

The trace section 50 is to realize a real-time trace function. The trace section 50 is connected to the debugging tool 60 by four lines, 3-bit DST [2:0] representing the state of an instruction being executed by the CPU 22 and DPCO representing the program count (PC) of a branched destination.

The debugging tool 60 includes a main monitor section 62 and is connected to a host system 66 which may be realized by a personal computer or the like. When the host system 66 issues a debugging command such as program load, step execution or other command through operation of the user, the main monitor section 62 then converts (decomposes) this command into a primitive command. As data instructing the execution of the primitive command is transmitted from the main monitor section 62 to the mini monitor section 40, the mini monitor section 40 then executes the instructed primitive command.

Figure 4:
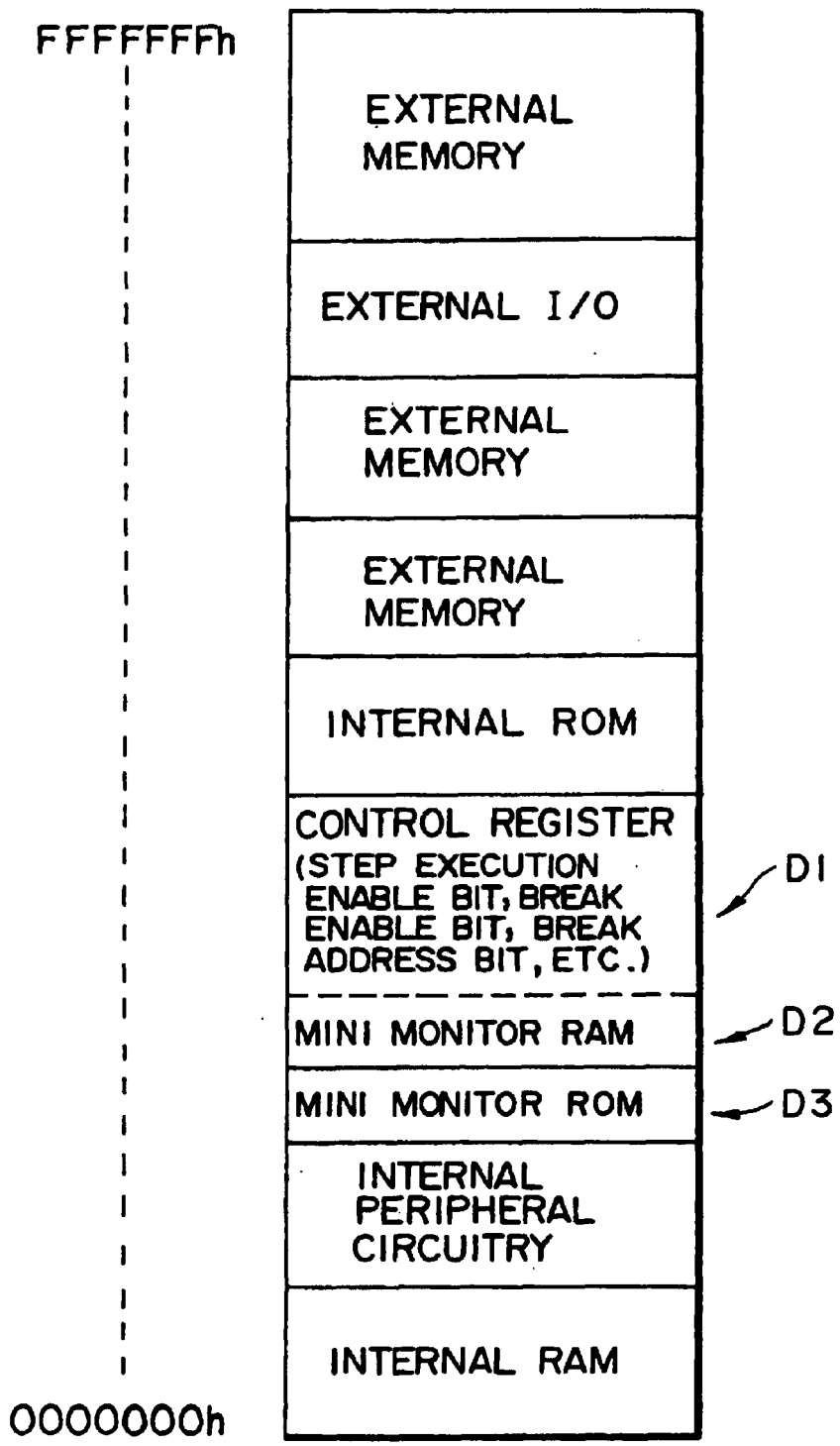
FIG. 4 illustrates a memory map in the debugging mode.

FIG. 4 shows a memory map in the debugging mode. As shown by D1, D2 and D3 in FIG. 4, the addresses of the control register 46, mini monitor RAM 44 and mini monitor ROM 42 are also allocated onto the memory map in the debugging mode.

3. Conversion to Primitive Command

FIGS. 5A to 5D schematically show the conversion of various debugging commands into primitive commands.

As shown in FIG. 5A, for example, it is now assumed that a debugging command for loading a 12-byte program containing (ADD---, SUB---, AND---, OR---, XOR--- and LD.W---) at an address 80010h is issued. The program load command is converted into three primitive write commands: write (80010h, ADD--- and SUB---), write (80014h, AND--- and OR---) and write (80018h, XOR--- and LD.W---). In other words, the program load command will be realized by the mini monitor program executing these three primitive write commands.

It is also assumed that a step execution command is issued as shown in FIG. 5B. The step execution command is then converted into write command to the step execution enable bit in the control register 46 (write command to the address at D1 in FIG. 4) and go command. In other words, the step execution command will be realized by the mini monitor program executing these primitive, write and go commands.

It is further assumed that an internal register read command is issued as shown in FIG. 5C. The internal register read command is converted into read command (read command for the address at D2 in FIG. 4) from the mini monitor RAM 44 (the save destination of the contents of the internal register) on the memory map. In other words, the internal register read command will be realized by the mini monitor program executing such a primitive read command. An internal register write command, a memory read command and a memory write command, are also be realized in the similar manner.

It is further assumed that a breakpoint setting command is issued as shown in FIG. 5D. The breakpoint setting command is converted into write commands for the break enable bit and break address bit of the control register 46. In other words, the bread-point setting command will be realized by the mini monitor program executing this primitive write command.

In such a manner, according to this embodiment, various complicated debugging commands can be converted into simple primitive commands such as read, write and go commands. The mini monitor program is only required to execute these primitive read, write and go command. Therefore, the size of instruction code in the mini monitor program can greatly be reduced. As a result, the capacity of the mini monitor ROM 42 can be reduced with the on-chip debug function being realized by a reduced scale of hardware.

4. Structural Example of SIO

FIG. 6 shows structural example of SIO 48. The SIO 48 includes a send/receive buffer 70, a shift register 76, a send/receive switching section 78, a clock control section 80 and a control register 84.

The send/receive buffer 70 is one for temporarily accumulating send data and receive data, and includes a send buffer 72 and a receive buffer 74. The shift register 76 has a function of converting parallel data transmitted from the send buffer 72 into serial data and outputting toward the send/receive switching section 78. The send/receive switching section 78 has a function to switch sending and receiving data. This enables half-duplex data transfer using TXD/RXD.

The clock control section 80 includes a frequency division circuit 82 for dividing BCLK and outputs sampling clocks SMC1 which are obtained by the division toward the shift register 76. The shift register 76 is operated according to this SMC1. BCLK is also supplied to the debugging tool 60. Thus, BCLK will be in common between the microcomputer 20 and debugging tool 60.

The division ratio in the frequency division circuit 82 is set by the control register 84. In other words, the division ratio in the frequency division circuit 82 will be set when the mini monitor program being executed by the CPU 22 writes a desired division ratio into the control register 84. The address of the control register 84 is also allocated at a location D1 in FIG. 4 as in the control register 46 of FIG. 3.

5. Structural Example of Debugging Tool

Figure 7:
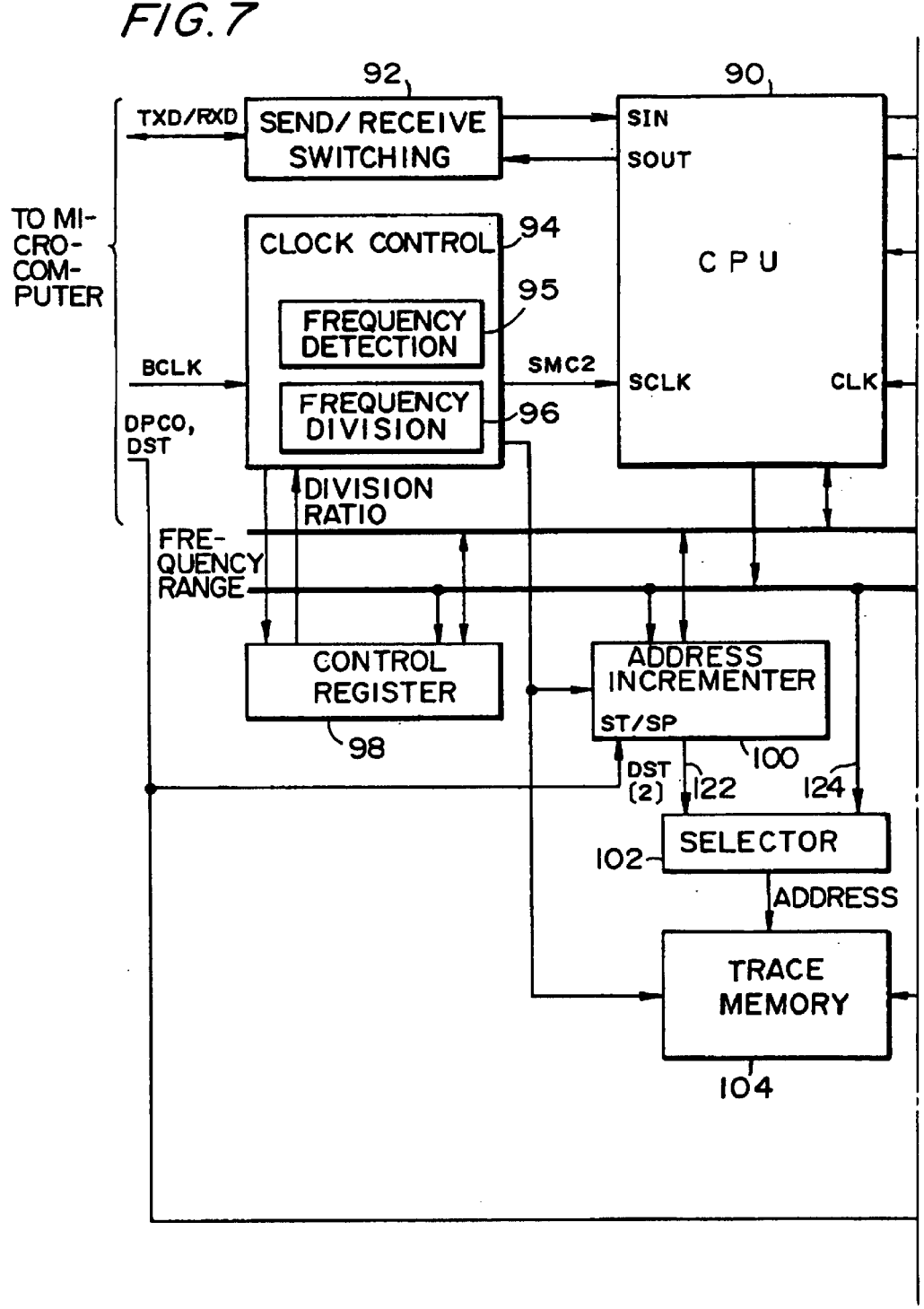
FIG. 7 is a functional block diagram of an example of the structure of the debugging tool.

FIG. 7 shows an example of the structure of the debugging tool 60.

CPU 90 executes a program stored in ROM 108 and controls the entire debugging tool 60. A send/receive switching section 92 switches between the data transmission and the data reception. A clock control section 94 controls clocks to be supplied to the SCLK terminal of the CPU 90, address incrementer 100 and trace memory 104. The BCLK from the microcomputer 20 (SIO 48) is input to the clock control section 94. The clock control section 94 comprises a frequency detection circuit 95 and a frequency division circuit 96. The frequency detection circuit 95 detects a frequency range to which the frequency of BCLK belongs, and the sensed result is then outputted toward a control register 98. The division ratio in the frequency division circuit 96 is controlled by the control register 98. In other words, a main monitor program (which has been stored in a main monitor ROM 110) reads the range of frequency out of the control register 98. The main monitor program then determines an optimum division ratio depending on this range of BCLK frequency, the optimum division ratio being then written into the control register 98. With this division ratio, the frequency division circuit 96 divides BCLK to generate SMC2 and outputs SMC2 toward the SCLK terminal of the CPU 90.

An address incrementer 100 increments the address in the trace memory. A selector 102 selects either one of line 122 (address outputted from the address incrementer 100) or 124 (address from an address bus 120) and outputs the address toward the address terminal of the trace memory 104. Another selector 106 selects either one of line 126 (DST [2:0] and DPCO that are output by the trace section 50 in FIG. 3) or 128 (data bus 118) and to output data toward the data terminal of the trace memory 104 or to extract data from that data terminal.

ROM 108 includes a main monitor ROM 110 (which corresponds to the main monitor section 62 of FIG. 3). The main monitor ROM 110 has stored a main monitor program which performs processing to convert debugging commands into primitive commands as described in connection with FIGS. 5A to 5D. RAM 112 acts as a working area for CPU 90.

RS232C interface 114 and parallel interface 116 function as interfaces to the host system 66 shown of FIG. 3. Thus, debugging commands from the host system 66 are inputted to CPU 90 through these interfaces. A clock generation section 18 generates clocks that activate the CPU 90.

The real-time tracing according to this embodiment will briefly be described. In this embodiment, the trace memory 104 stores 3-bit DST [2:0] representing the state of instruction executed by the CPU 22 of FIG. 3 and DPCO representing the PC (program count) value at a branch destination. Trace data is created based on the data stored in the trace memory 104 and the source code of the user program. Thus, the real-time trace function can be realized while reducing the number of lines connecting between the microcomputer 20 and the debugging tool 60.

Figure 8A:
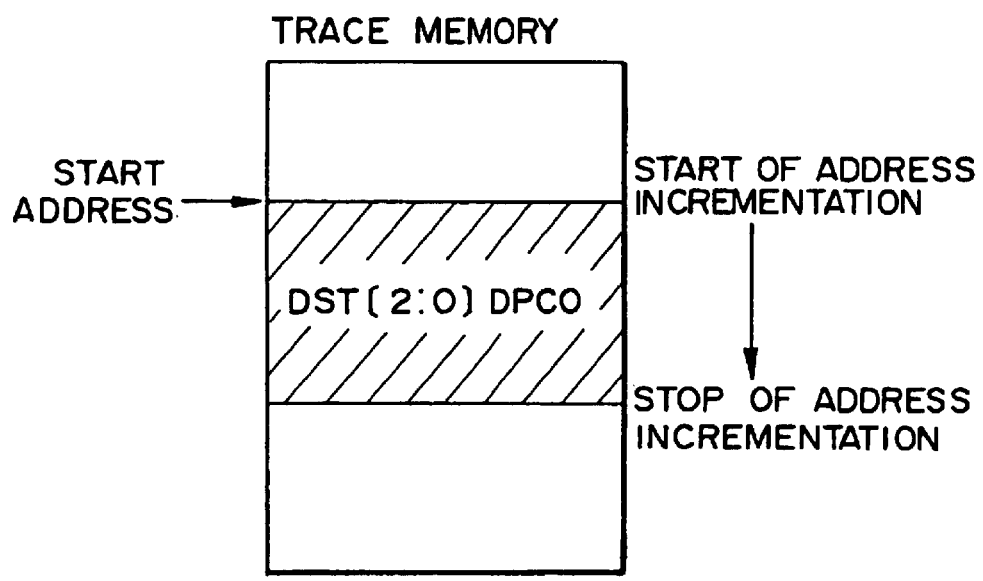
FIGS. 8A and 8B illustrate a real-time tracing.
Figure 8B:
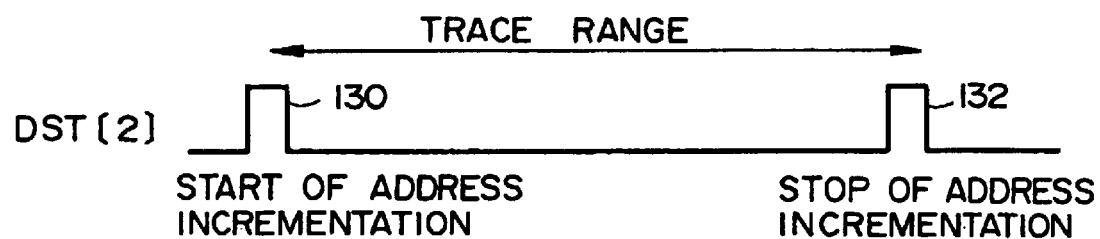

In a user program execution mode, the line 122 is selected to input the output of the address incrementer 100 into the address terminal of the trace memory 104 through the selector 102. The line 126 is also selected to input DST [2:0] and DPCO into the data terminal of the trace memory 104 through the selector 106. First of all, such a start address as shown in FIG. 8A is set at the address incrementer 100 by the CPU 90 using the data bus 118 and address bus 120. Line DST [2] for specifying the range of trace is connected to the ST/SP (start/stop) terminal of the address incrementer 100. When a first pulse 130 is inputted into the DST [2] line as shown in FIG. 8B, the address incrementation of the address incrementer 100 is started. When a second pulse 132 is inputted into the DST [2] line, the address incrementation of the address incrementer 100 is stopped to stop the tracing operation. Thus, data within the desired range of trace (DST [2:0] and DPCO) can be stored in the trace memory 104.

On the other hand, when the mode is shifted from the user program execution mode to the debugging mode, the line 124 is selected to input the address from the address bus 120 to the address terminal of the trace memory 104 through the selector 102. The line 128 is also selected to output the data from the trace memory 104 toward the data bus 118 through the selector 106. Thus, the CPU 90 (main monitor program) can read out the data (DST [2:0] and DPCO) stored in the trace memory 104 at the debugging mode. Therefore, trace data can be created by the read data and the source code of the user program.

6. Transmission/Reception of Data

Figure 9A:
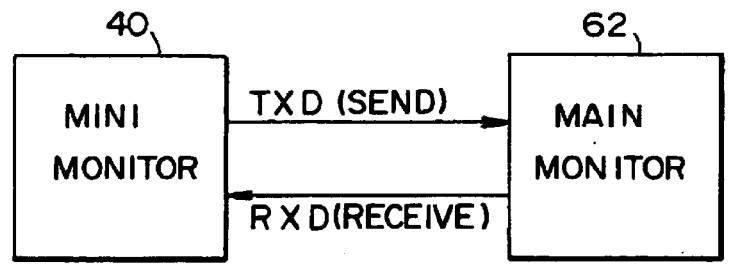
FIGS. 9A to 9C illustrate communication methods between a mini monitor section and a main monitor section.

A method by which TXD (transmission) and RXD (reception) lines are separately provided and communication is full-duplex could be considered for the communication of debugging data between the mini monitor section 40 and the main monitor section 62, as shown in FIG. 9A.

When two lines (terminals) are used for such communication of this debugging data, however, the number of terminals (number of pins) of the microcomputer will be increased thereby. This leads to increase of the manufacturing cost for the microcomputer.

Figure 9B:
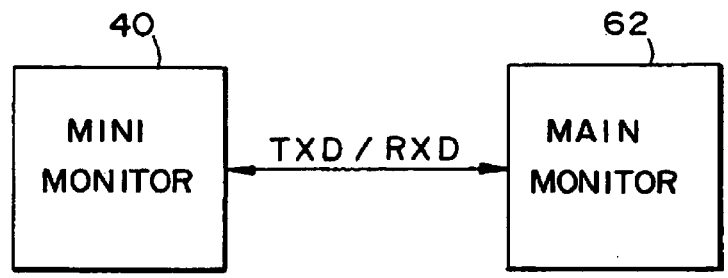

According to this embodiment, therefore, a single TXD/RXD line (bidirectional communication line) is provided between the mini monitor section 40 and the main monitor section 62 to perform half-duplex bidirectional communication, as shown in FIG. 9B. Thus, the number of terminals in the microcomputer can be minimized to reduce the manufacturing cost of the microcomputer.

Figure 9C:
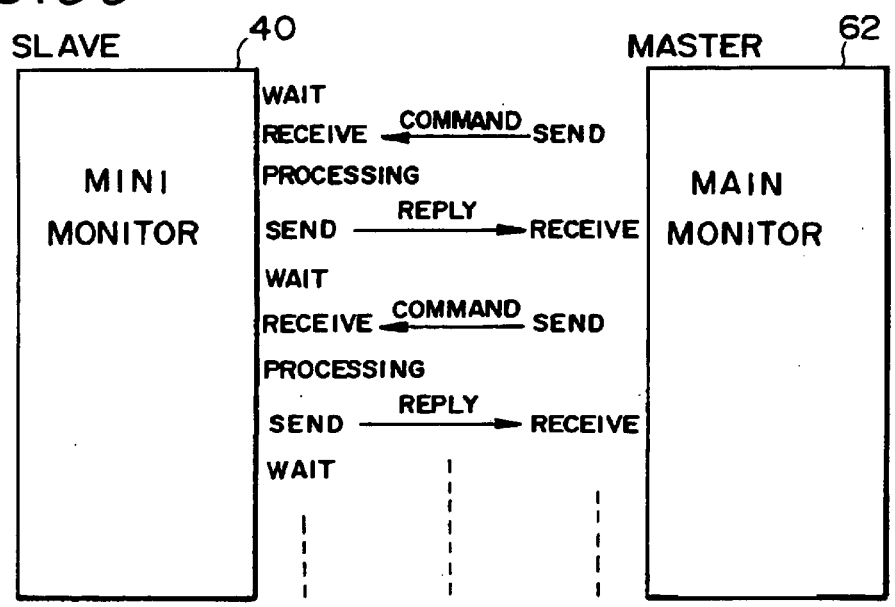

In this embodiment, further, when the conditions is such that the mini monitor section 40 being a slave has received data from the main monitor section 62 being a master, the mini monitor section 40 performs processing corresponding to that receive data and sends response data in answer to that receive data back to the main monitor section 62, as shown in FIG. 9C. In other words, when the main monitor section 62 sends data (command) to the mini monitor section 40 placed in its wait state, the mini monitor section 40 receives the data and performs a processing corresponding to the receive data. Data (reply) corresponding to the received data is then sent to the main monitor section 62. Thereafter, the mini monitor section 40 is placed in its wait state until it receives data from the main monitor section 62. In other words, the operation of the mini monitor section 40 is stopped until it receives data from the main monitor section 62 and the operation of the mini monitor section 40 starts on condition that data has been received. This enables a proper transfer of data between the mini monitor section 40 and the main monitor section 62 while utilizing a single communication line.

The communication method of FIG. 9A is advantageous than that of FIG. 9B with respect to high-speed data communication since the separate TXD and RXD lines are utilized. The communication technique of FIG. 9A is further advantageous in that if a communication error occurs in one of the mini monitor section 40 and main monitor section 62, an error message can immediately be returned to the other of the mini monitor section 40 and main monitor section 62. For example, when a communication error occurs in the mini monitor section 40, it can instantly return an error message to the main monitor section 62 using the TXD line without waiting the termination of data reception through the RXD line.

On the other hand, in this embodiment, BCLK is used in common between the mini monitor section 40 and main monitor section 60, as will be described later. This provides an optimal and high-speed data communication. Therefore, the high-speed transfer of debugging data can be carried out without any problem even if a single communication line as shown in FIG. 9B is provided rather than providing two communication lines as shown in FIG. 9A.

As will be described later, send/receive data in this embodiment is of shorter fixed-length (e.g., 14 bytes). Therefore, if any communication error occurs in the mini monitor section 40, for example, time delay will not be very increased even though an error message is transferred after the reception processing has terminated. Since the length of the send/receive data is short, the occurrence of communication error itself can be minimized.

In such a manner, this embodiment provides an advantage in that a single communication line of debugging data is used to reduce the number of terminals of the microcomputer. The disadvantages produced by providing such an advantage (i.e., reduction of communication speed and delay of error message) can be overcome by the fact that BCLK is used in common and that the send/receive data are of shorter fixed-length.

7. Format and Type of Send/Receive Data

FIG. 10A shows an example of a format of data to be sent and received through the TXD/RXD lines. The send/receive data is a fixed-length data of 14 bytes comprising one byte of ID (command identifying data) field, one byte of data size field, four bytes of address field, four bytes of data 1 field and four bytes of data 2 field.

As shown in FIG. 10B, 00h being an identifying data of go command is set at the ID field of the data to be received by the mini monitor section 40 when the main monitor section 62 instructs the mini monitor section 40 to execute the go command. At this case, the mini monitor section 40 will not send data to the main monitor section 62.

As shown in FIG. 10C, 01h being an identifying data of write command is set at the ID field of the data to be received by the mini monitor section 40 when the main monitor section 62 instructs the mini monitor section 40 to execute the write command. Furthermore, write address, write data 1 and write data 2 are set at the address, data 1 and data 2 fields of the receive data, respectively. 01h is set at the data 1 field of the send data of the mini monitor section 40.

A variety type of write commands can be used, such as write command for byte data, write command for half-word data, write command for word data and write command for double-word data, depending on the length of the data to be written. In such a case, different ID's will be allocated to the respective write commands.

As shown in FIG. 10D, 02h being an identifying data of read command is set at the ID field of the data to be received by the mini monitor section 40 when the main monitor section 62 instructs the mini monitor section 40 to execute the read command. A read address is also set at the address field of the receive data. Read data 1 and read data 2, which are obtained by processing the read command, are set at the data 1 and data 2 fields of the send data of the mini monitor section 40, respectively.

In this embodiment, primitive commands to be executed by the mini monitor section 40 include external routine jump command, data fill command and other commands in addition to go, write and read commands.

The external routine jump command is one for instructing the jump to an external routine. When such an external routine jump command is used, the procedure can jump to the routine of an initializing program or writing program of a flash memory (EEPROM).

As shown in FIG. 11A, 03h being an identifying data of the external routine jump command is set at the ID field of the data to be received by the mini monitor section 40 when the main monitor section 62 instructs the mini monitor section 40 to execute the external routine jump command. 18h (data for checking malfunction), % R12 (routine address), % R13 (write data) and % R14 (data address) are also set as the data size, address, data 1 and data 2 fields of the receive data, respectively. Furthermore, % R10 (return value; if the return value is 0, the program will normally be terminated) is set at the data 1 field of the send data of the mini monitor section 40.

The data fill command is one for filling a memory with a given value (e.g., 0). For example, if all the bits in a large-capacity memory are to be set at the value of zero, using write command will very prolong the processing time. In such a case, the data fill command is useful. When the main monitor section 62 instructs the mini monitor section 40 to execute the data fill command, 04h being an identifying data of the data fill command is set at the ID field of the data to be received by the mini monitor section 40, as shown in FIG. 11B. Furthermore, data size 1, 2 or 4, start address, fill number, fill pattern are set at the data size, address, data 1 and data 2 fields of the receive data, respectively.

According to this embodiment, the receive data from the main monitor section 62 contains primitive command identifying data (ID) to be executed by the mini monitor section 40. Thus, an instruction for execution of any primitive command can easily be transferred to the mini monitor section 40.

8. Fixed-Length Send/Receive Data

In this embodiment, the send/receive data between the mini monitor section 40 and the main monitor section 62 are of fixed-length of 14 bytes, as shown in FIG. 10A. Thus, the size of instruction code in the mini monitor program can further be reduced.

Figure 12A:
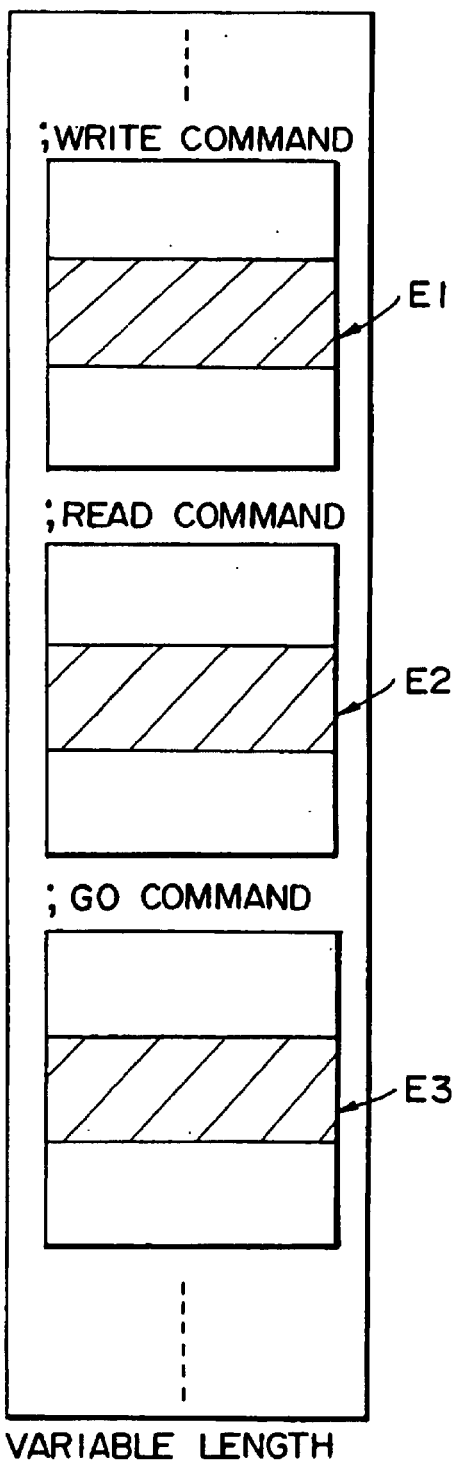
FIGS. 12A and 12B illustrate the sizes of source code in a mini monitor program when the send/receive data are of variable-length and fixed-length, respectively.

If the send/receive data are of variable length, almost all the commands are required to have such processing portions (instruction line) E1, E2 and E3 as shown in FIG. 12A. These processing portions E1, E2 and E3 judge how much data needs to be processed. In other words, when variable-length data is to be processed, it is required to check the number of data to be processed based on the data size in the send/receive data. After the checked number of data has been held, on RAM which is a working area, it is required to decrement the number of data on each termination of data processing or to judge whether or not the number of data becomes equal to zero. This will increases the size of source code in the mini monitor program, as shown in FIG. 12A.

Figure 12B:
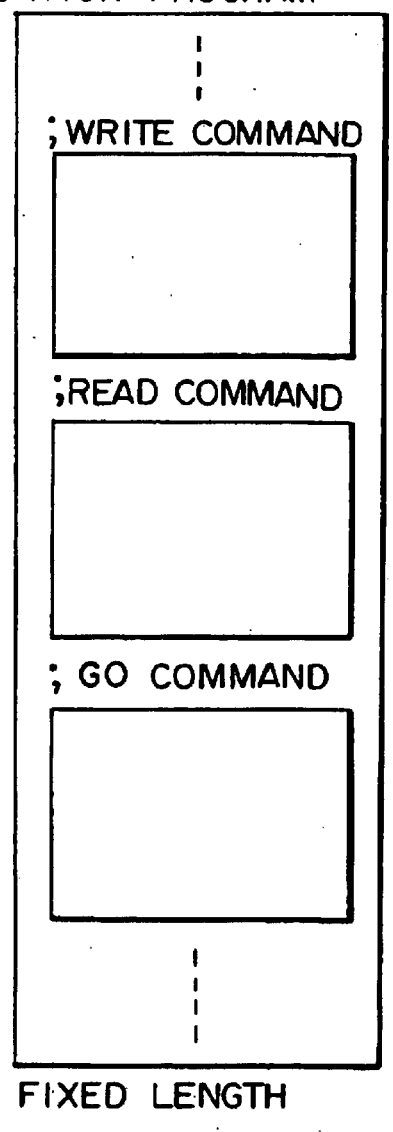

On the contrary, this embodiment uses the send/receive data of fixed-length. As can be seen from comparison between FIGS. 12A and 12B, therefore, the size of source code in the mini monitor program can be reduced to approximately two-third of the case where the send/receive data is of variable-length. As a result, the size of the mini monitor ROM 42 shown in FIG. 3 can further be reduced to provide the on-chip debugging function through a reduced scale of hardware.

Since the send/receive data of fixed-length will not effectively be handled in communication, it is disadvantageous in that the communication speed is reduced. According to this embodiment, therefore, BCLK is shared by the mini monitor section 40 and main monitor section 62, as will be described. This improves the data communication speed and overcomes the aforementioned problem.

9. Mini Monitor ROM

As shown in FIG. 3, this embodiment provides the mini monitor ROM 42 in the microcomputer 20. The mini monitor ROM 42 has stored the mini monitor program. Thus, the scale of hardware can be reduced to decrease the manufacturing cost for the microcomputer.

Figure 13A:
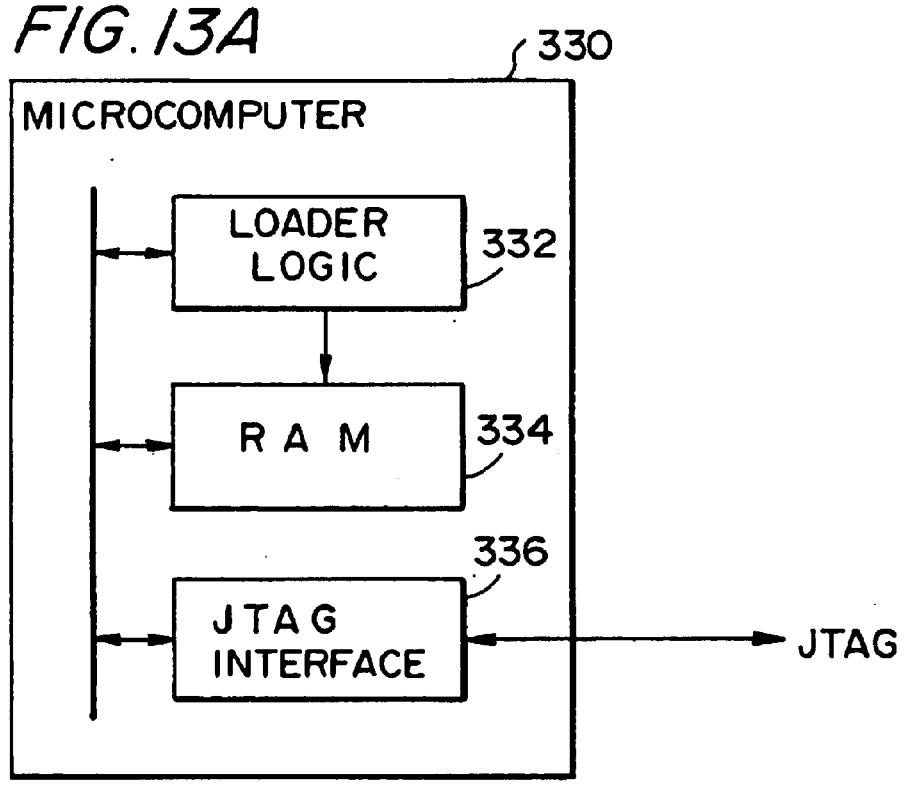
FIGS. 13A and 13B illustrate techniques by which the mini monitor program is stored in the ROM.

For example, with an arrangement shown in FIG. 13A, a microcomputer 330 may comprise a loader logic circuit 332 and a RAM 334. The loader logic circuit 332 is used to load the mini monitor program into the RAM 334 from outside through JTAG interface 336. In such an arrangement, however, it is required for the microcomputer 330 to be provided with the loader logic circuit 332 and the RAM 334 having its size 5 to 10 times larger than that of ROM. This will increase the microcomputer 330 in scale and cost.

Figure 13B:
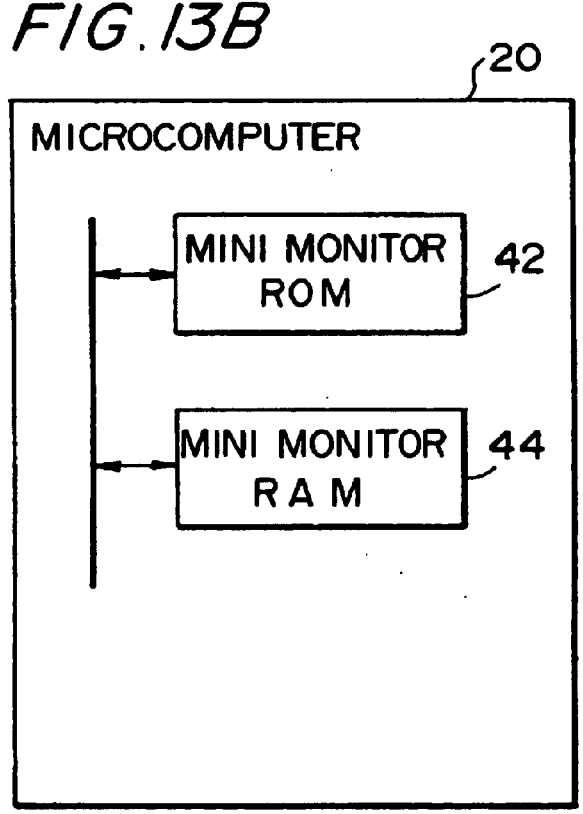

On the contrary, in this embodiment, the mini monitor program is stored in the mini monitor ROM 42 having its size ⅕ to 1/10 times larger than that of RAM, as shown in FIG. 13B. This will decrease the microcomputer 20 in scale and cost, in comparison with the arrangement of FIG. 13A.

In the arrangement of FIG. 13A, furthermore, CPU is temporarily stopped in operation on power-on or reset. The mini monitor program is then loaded into the RAM 334 by the loader logic circuit 3332. Thereafter, CPU must be re-started in the debugging mode. Thus, the process is complicated with an increased time required to start the debugging mode.

On the contrary, this embodiment of FIG. 13B does not require the loading of the mini monitor program into the RAM. Accordingly, it is not required to temporarily stop the operation of CPU on power-on or reset. CPU can instantly be started in debugging operation.

10. Sharing of BCLK

As data communication method between the microcomputer and the debugging tool, typically be of so-called synchronous method or start-stop synchronization can be applied. It is also desirable that the number of communication lines between the microcomputer and the debugging tool is as small as possible, in ICE. It is further desirable that the sampling error in the communication data is produced as little as possible.

Figure 14A:
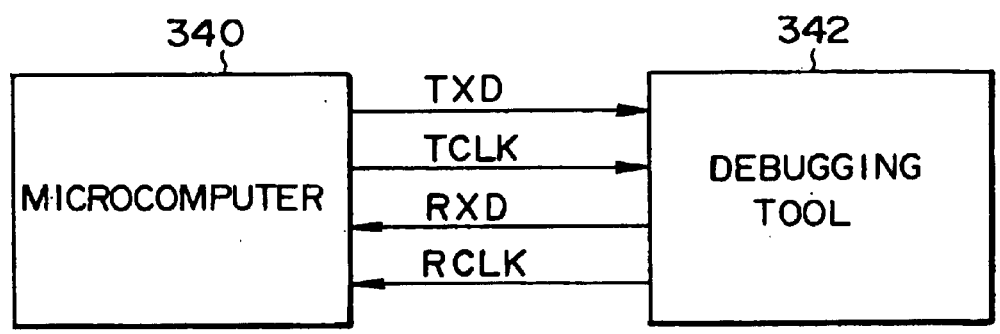
FIGS. 14A and 14B illustrate synchronous and start-stop synchronous communication techniques.

However, the communication in synchronous method requires four communication lines between a microcomputer (first information processing device) 340 and a debugging tool (second information processing device) 342, as shown in FIG. 14A. These four communication lines include a TXD line for send data, a TCLK line for sampling clock of TXD, a RXD line for receive data and a RCLK line for sampling clock of RXD. The unnecessary number of communication lines increases unnecessarily.

On the other hand, in start-stop synchronization, the microcomputer 340 and the debugging tool 342 use separate clocks of substantially the same frequency. For example, the microcomputer 340 may use a CLK1 while the debugging tool 342 may use a CLK2, the CLK1 and CLK2 being of substantially the same frequency clock. As shown in FIG. 15A, the microcomputer 340 divides CLK1 into sampling clocks SMC1 which are used to sample bits in the data communicated in the start-stop synchronization (start bit, D0 to D7 bits and stop bit). As shown in FIG. 15B, the debugging tool 342 divides CLK2 to generate sampling clocks SMC2 which are used to sample bits in the data communicated in the start-and-stop synchronization (start bit, D0 to D7 bits and stop bit).

However, the start-stop synchronization type communication increases the operational frequency of CPU included in the microcomputer 340. Therefore, the frequency of CLK1 and CLK2 is also increased. Thus, the frequency of SMC1 and SMC 2 is increased so that the sampling error in the communication data tends to occur more frequently. In other words, the frequency of CLK1 and CLK2 may be increased to any level at which sampling errors do not occur in the communication data. This means that the microcomputer 340 cannot perform its debugging operation in an environment in which it operates at high speed. In other words, the clock frequency in the microcomputer must be reduced during the debugging operation.

To overcome such a problem, BCLK for generating sampling clocks are used in common between the microcomputer 140 and the debugging tool 150 in this embodiment.

Figure 17A:
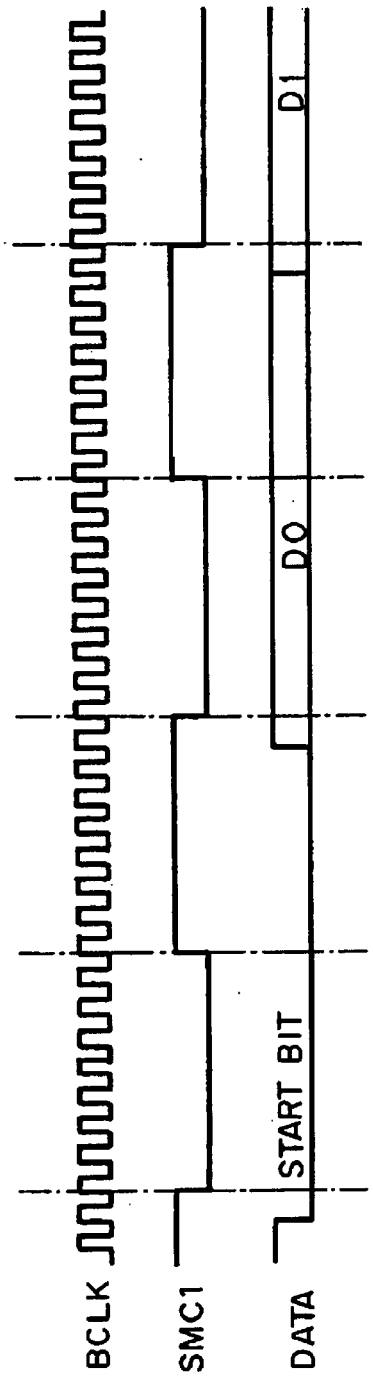
FIGS. 17A and 17B illustrate timing waveforms of clock, sampling clock and sampling data in the method of FIG. 16.

More particularly, the microcomputer (first information processing device) 140 comprises a communication section 142 (which corresponds to SIO 48 in FIG. 3) which comprises a send/receive circuit 144 (which corresponds to the send/receive buffer 70, shift register 76 and send/receive switching section 78 in FIG. 6) and a frequency division circuit 146 (which corresponds to the frequency division circuit 82 in FIG. 6). The frequency division circuit 146 divides BCLK (first clock) into sampling clocks SMC1 which are used to sample bits in the data transmitted and received in the start-stop synchronization, as shown in FIG. 17A. The send/receive circuit 144 then transfers data based on SMC1. The microcomputer 140 supplies BCLK to a debugging tool (second information processing device) 150.

Figure 17B:
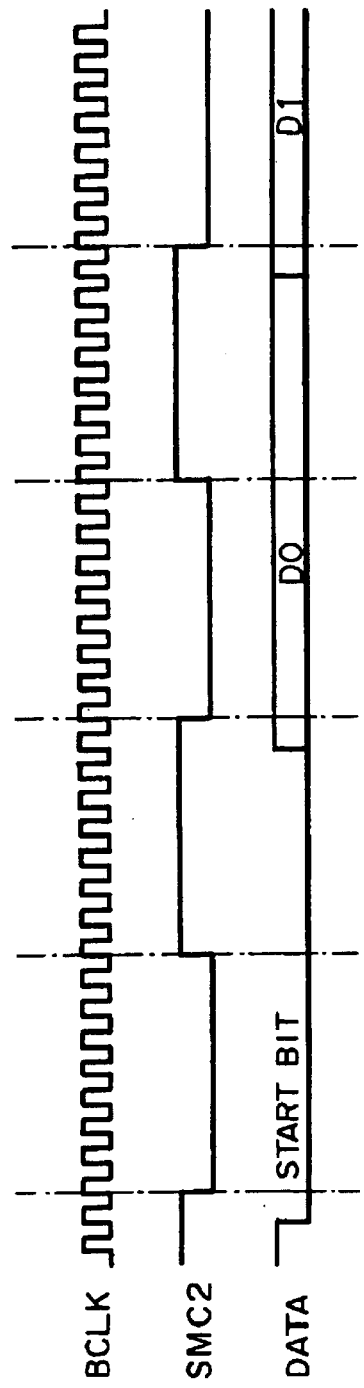

The debugging tool 150 comprises a communication section 152 which includes a send/receive circuit 154 (which corresponds to the CPU 90 and send/receive switching section 92 in FIG. 7) and a frequency division circuit 156 (which corresponds to the frequency division circuit 96 in FIG. 7). The frequency division circuit 156 divides BCLK from the microcomputer 140 to generate sampling clocks SMC2 as shown in FIG. 17B. Then, the send/receive circuit 154 transfers data, based on SMC2.

Figure 14B:
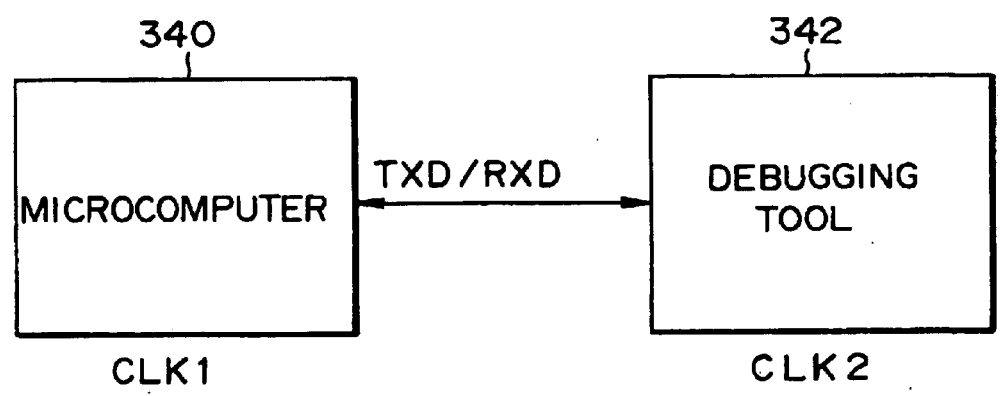
Figure 16:
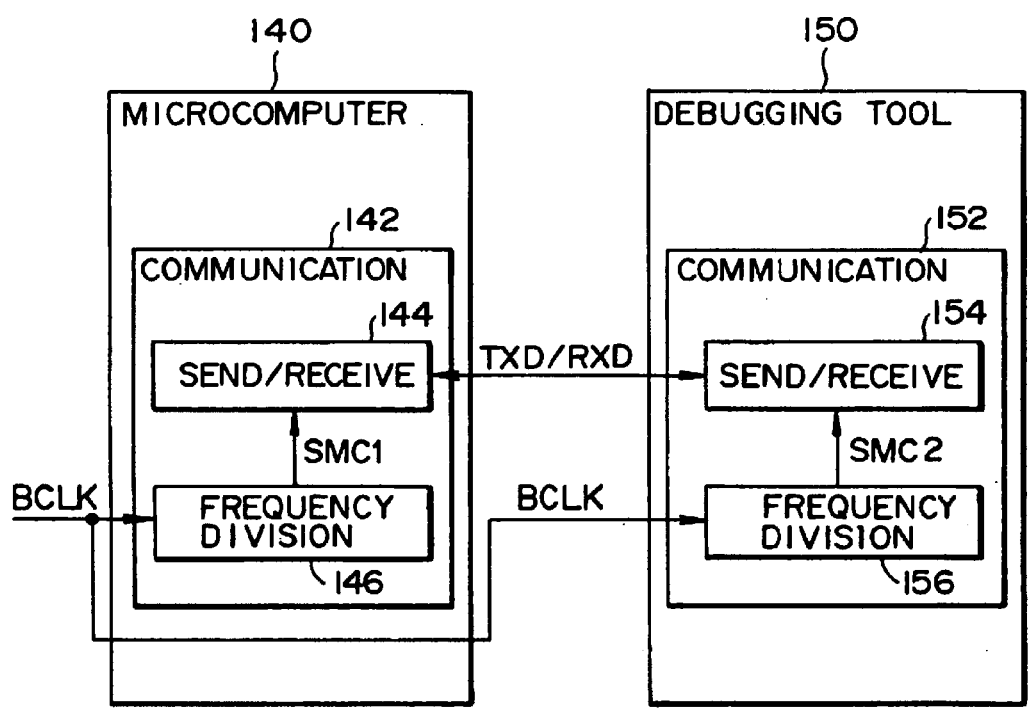
FIG. 16 illustrates a communication method of this embodiment.

Although this embodiment is of start-stop synchronization type, BCLK for generating the sampling clocks SMC1 and SMC2 is used in common between the microcomputer 140 and the debugging tool 150. Thus, the occurrence of sampling error in the communication data can highly be reduced in comparison with the communication of general start-stop synchronization as shown in FIG. 14B. Although the communication in synchronization method of FIG. 14A requires four communication lines, this embodiment only requires two communication lines as shown in FIG. 16 (three lines in case of the full-duplex communication). Thus, the number of communication lines between the microcomputer 140 and the debugging tool 150 can be reduced in comparison with that of FIG. 14A. As a result, the number of terminals of the microcomputer 140 can also be reduced. The microcomputer 140 can more inexpensively be manufactured.

Particularly, the arrangement of FIG. 14B increases the occurrence of sampling error in the communication data as the frequency of CLK1 (and CLK2) increases. Therefore, the arrangement of FIG. 14B cannot increase the clock frequency in the microcomputer 340 on debugging. When the microcomputer 340 is operated at higher speed, the debugging operation cannot be carried out.

On the contrary, both the microcomputer 140 and the debugging tool 150 in this embodiment of FIG. 16 generate sampling clocks based on BCLK. Therefore, the occurrence of sampling error will not be very increased even if the frequency of BCLK increases. As a result, the debugging operation can be performed in an environment in which the microcomputer 140 operates at a high speed, so that debugging can be performed in an environment that is close to that of actual operation.

Figure 18:
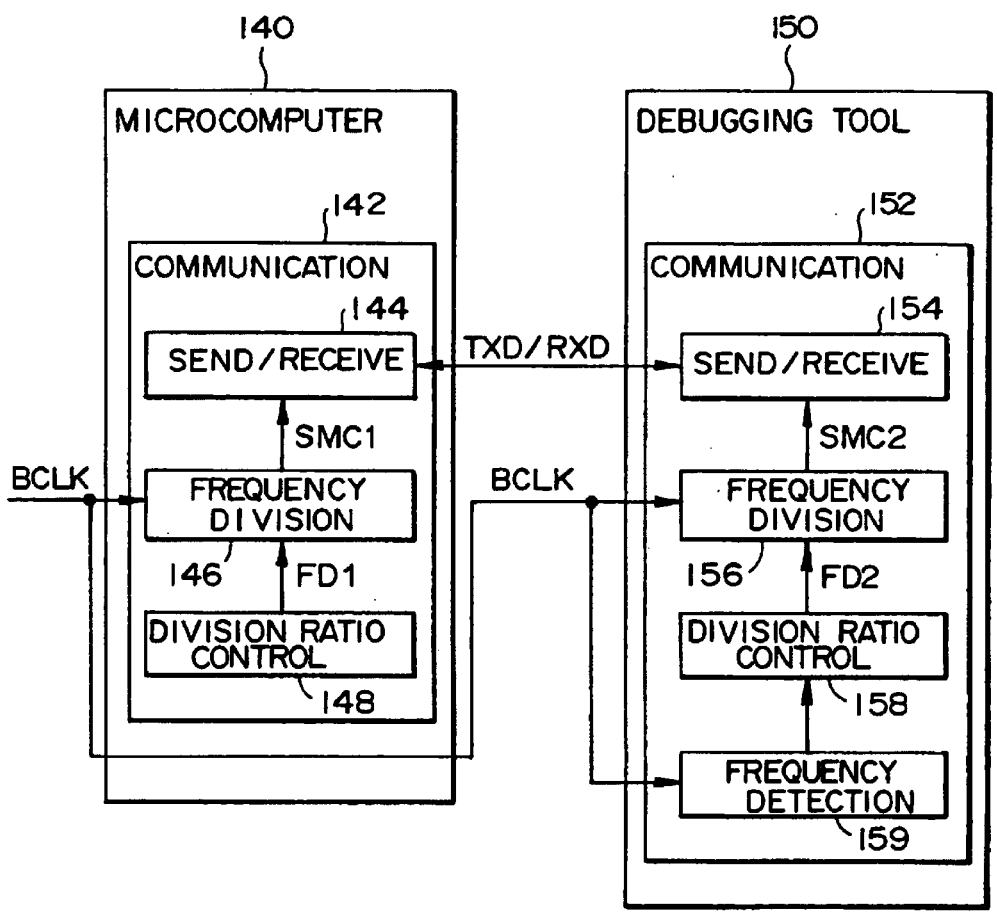
FIG. 18 illustrates another communication method of this embodiment.

In this embodiment, furthermore, as shown in FIG. 18, the communication section 142 comprises a division ratio control section 148 (which corresponds to the control register 84 in FIG. 6) and the communication section 152 comprises a division ratio control section 158 (which corresponds to the control register 98 in FIG. 7) and a frequency detection circuit 159 (which corresponds to the frequency detection circuit 95 in FIG. 7). Therefore, the system can variably control a division ratio FD1 on generating SMC1 and a division ratio FD2 on generating SMC2. As a result, the data communication can optimally be carried out at higher speed even though the frequency of BCLK varies.

More particularly, if the frequency of BCLK decreases as shown in FIG. 19A, the division ratios FD1 and FD2, which would be equal to 16 in FIGS. 17A and 17B, can be changed, for example, to eight. Thus, the sampling clocks SMC1 and SMC2, are changed from clocks of a frequency that is the BCLK frequency divided by 16 to clocks of a frequency that is the BCLK frequency divided by 8. As a result, the number of BCLK clock pulses corresponding to one-bit data will be changed to eight (8-clock mode) from sixteen (16-clock mode) in FIGS. 17A and 17B.

If the frequency of BCLK further decreases as shown in FIG. 19B, the division ratios FD1 and FD2, which would be equal to eight in FIG. 19A, are changed, for example, to four. Thus, the sampling clocks SMC1 and SMC2, are changed from clocks of a frequency that is the BCLK frequency divided by 8 to clocks of a frequency that is the BCLK frequency divided by 4. As a result, the number of BCLK clock pulses corresponding to one-bit data will be changed to four (4-clock mode) from eight (8-clock mode) in FIGS. 17A and 17B.

In such a manner, the communication speed of data will not eventually be reduced even if the frequency of BCLK decreases. As a result, the data communication can optimally be carried out at higher speed.

It is particularly general that the clock frequency in the microcomputer is variable depending on the user which uses the microcomputer. For example, one user may operate the microcomputer with a clock of 60 MHz while another user may operate the microcomputer with a clock of 20 MHz.

In the communication method of FIGS. 14A and 14B, however, the speed of data communication will also be varied as the clock frequency of the microcomputer is changed. More particularly, the speed of data communication will also be reduced if the clock frequency is reduced. Therefore, the data communication cannot be carried out at maximum speed.

On the contrary, in this embodiment, the division ratios FD1 and FD2 will also be changed to vary the number of clock pulses corresponding to one-bit data if the clock frequency in the microcomputer is varied depending on the user utilizing the microcomputer. In other words, the division ratios FD1 and FD2 may also be reduced to decrease the number of clock pulses corresponding to one-bit data as the clock frequency is reduced. As a result, the communication speed will not eventually be reduced, resulting in an optimum communication at higher speed. In other words, the communication can optimally be carried out depending on the user which uses any of various different clock frequencies.

The communication sections 142 and 152 will be described in more detail with reference to flowcharts shown in FIGS. 20 and 21.

Figure 20:
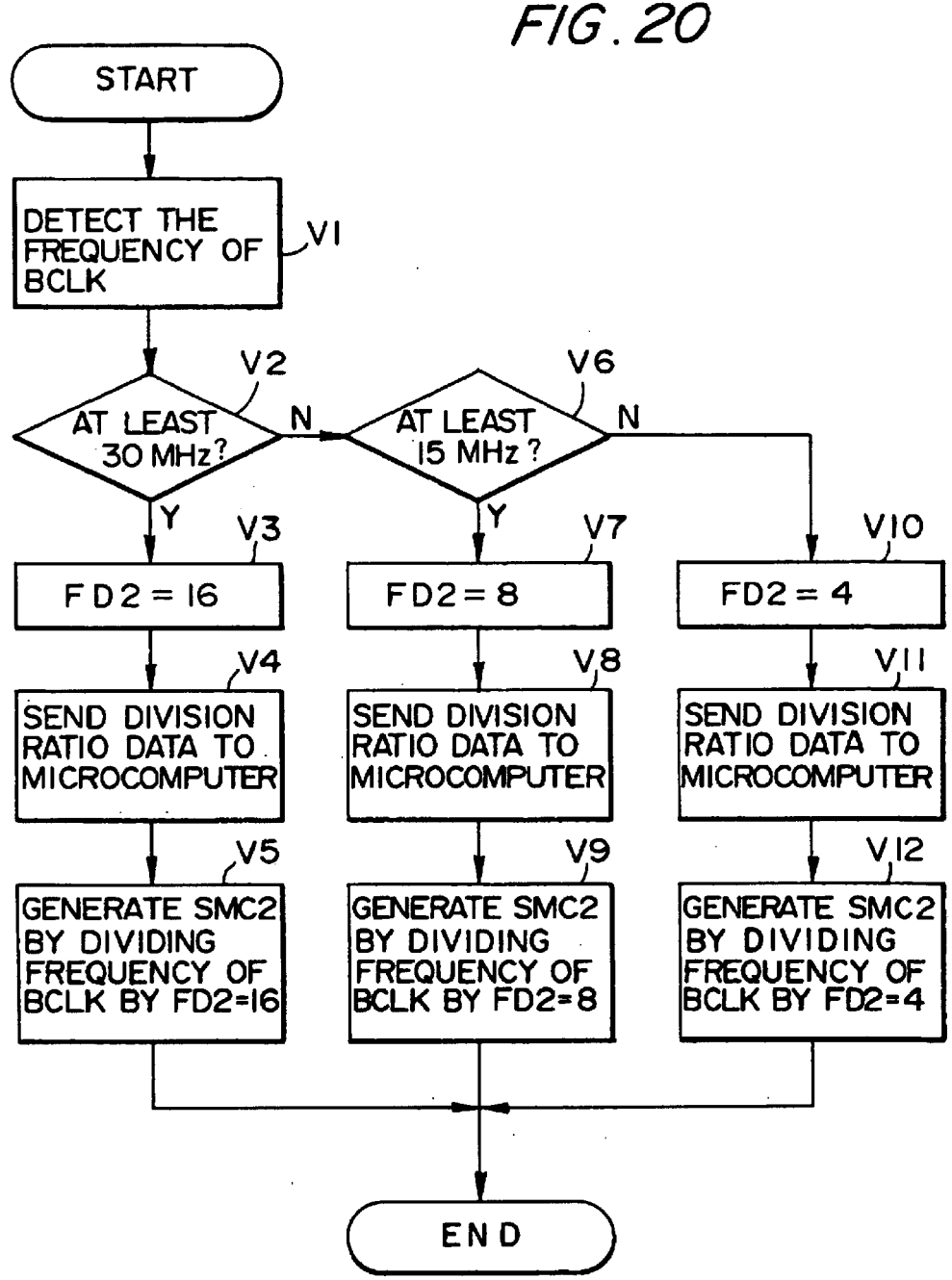
FIG. 20 is a flowchart illustrating a division ratio setting process on the debugging tool side.

As shown in FIG. 20, the frequency detection circuit 159 in the communication section 152 of FIG. 18 first detects the frequency of BCLK supplied from the microcomputer 140 (step V1). The frequency detection circuit 159 then judges whether or not the frequency of BCLK is at least 30 MHz (step V2). If the BCLK frequency is at least 30 MHz, the division ratio control section 158 sets the division ratio FD2 at 16 (step V3). Simultaneously, the division ratio control section 158 sends a division ratio data informing of the fact that FD2 is 16 to the microcomputer 140 through the send/receive circuit 154 (step V4). Then, the frequency division circuit 156 divides BCLK by FD2=16 to generate SMC2 (step V5). Subsequently, SMC2 will be used to perform the data transfer.

If the frequency of BCLK is lower than 30 MHz, the frequency detection circuit 159 judges whether or not the frequency is at least 15 MHz (step V6). If the frequency is at least 15 MHz, FD2 is set at 8 (step V7). Subsequently, steps similar to the steps V4 and V5 will be carried out (steps V8 and V9). If the frequency of BCLK is lower than 15 MHz, FD2 is set at 4 (step V10). Subsequently, steps similar to the steps V4 and V5 will be carried out (steps V11 and V12).

Figure 21:
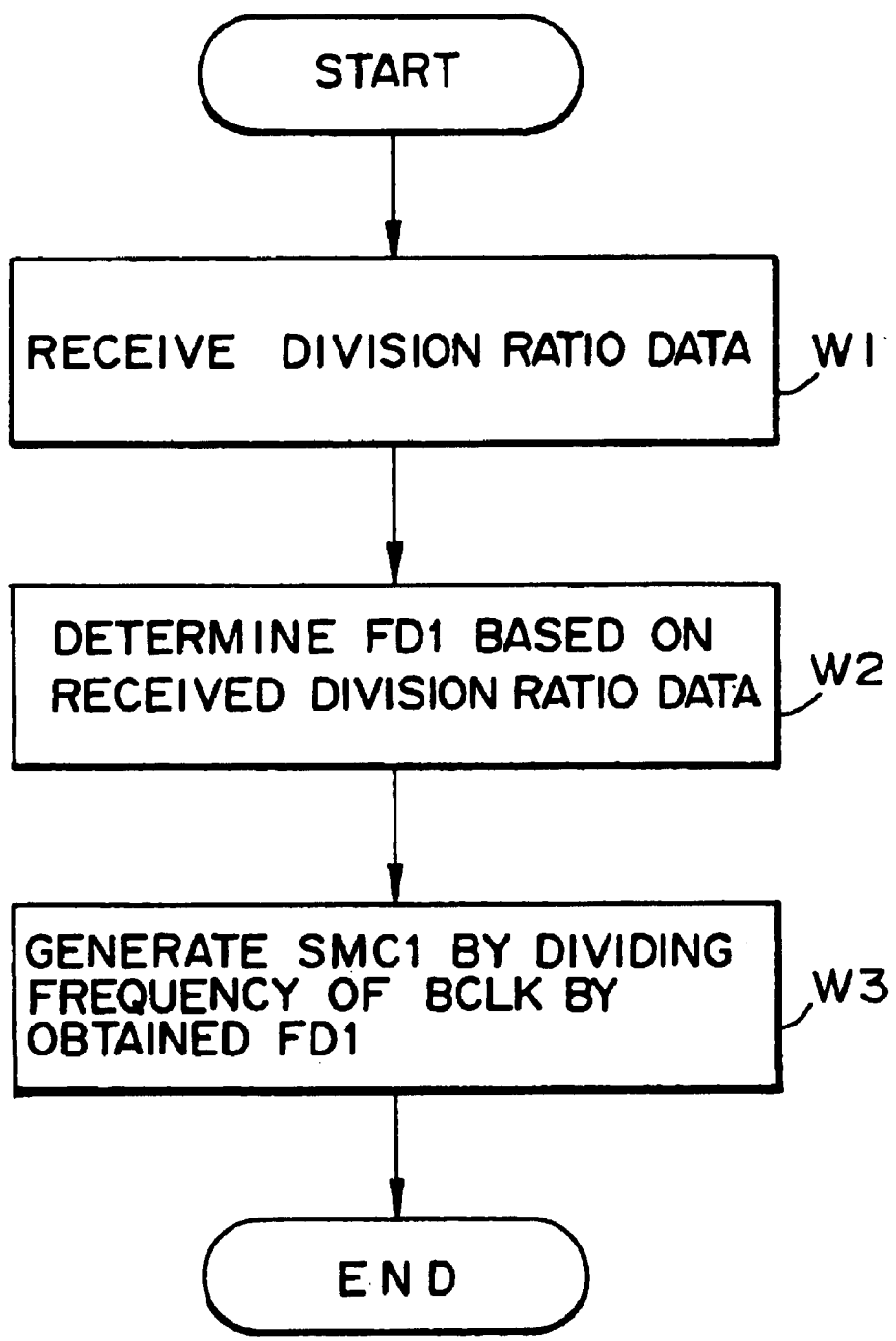
FIG. 21 is a flowchart illustrating a division ratio setting process on the microcomputer side.

On the other hand, the microcomputer 140 performs such a procedure as shown by the flowchart of FIG. 21. More specifically, the microcomputer 140 first receives the division ratio data from the debugging tool 150 through the send/receive circuit 144 (step W1). Based on the received division ratio data, the division-ratio control section 148 determines the division ratio FD1 (step W2) The frequency division circuit 146 divides BCLK by this value of FD1 to generate SMC1. Subsequently, SMC1 will be used to perform the transmission and reception of data.

11. Detailed Procedure in Mini Monitor Section

A detailed procedure in the mini monitor section will now be described.

Figure 22:
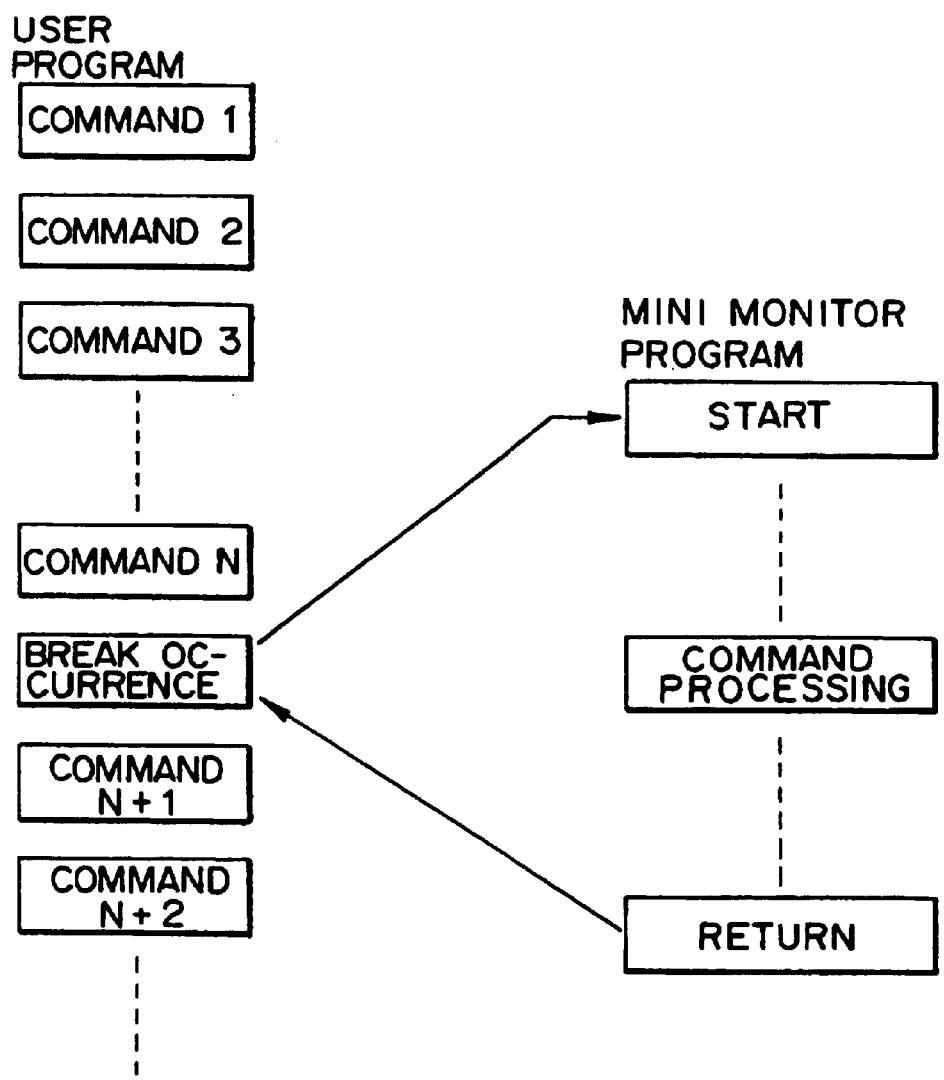
FIG. 22 illustrates the transition to the debugging mode from the user program execution mode.

As shown in FIG. 22, the mini monitor program is started when a break occurs during execution of the user program. The mode is shifted from the user program execution mode to the debugging mode. When the mini monitor program processes a given command to execute a return instruction, the mode will be returned from the debugging mode to the user program execution mode.

Figure 23:
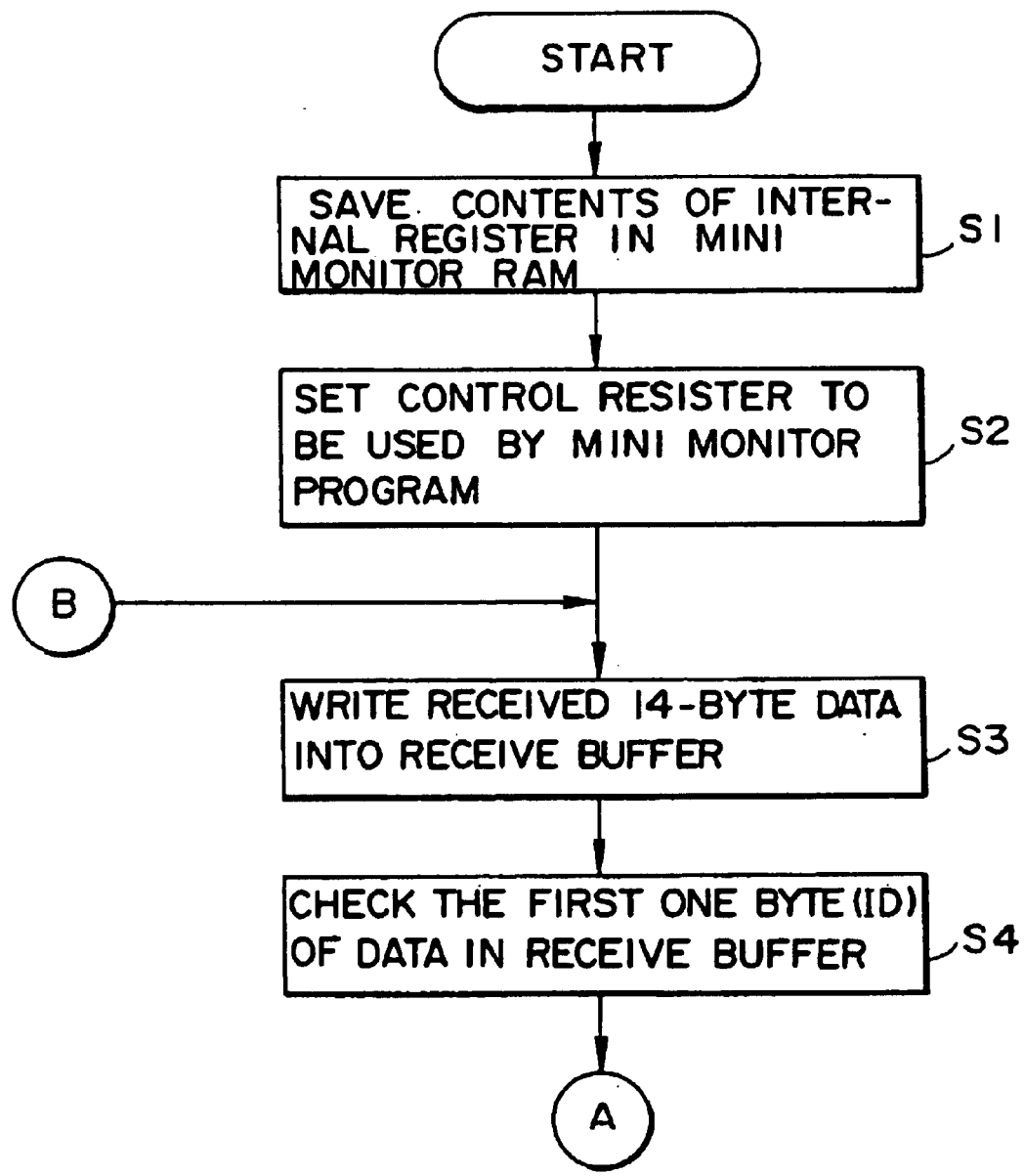
FIG. 23 is a flowchart illustrating a detailed process of this embodiment.
Figure 24:
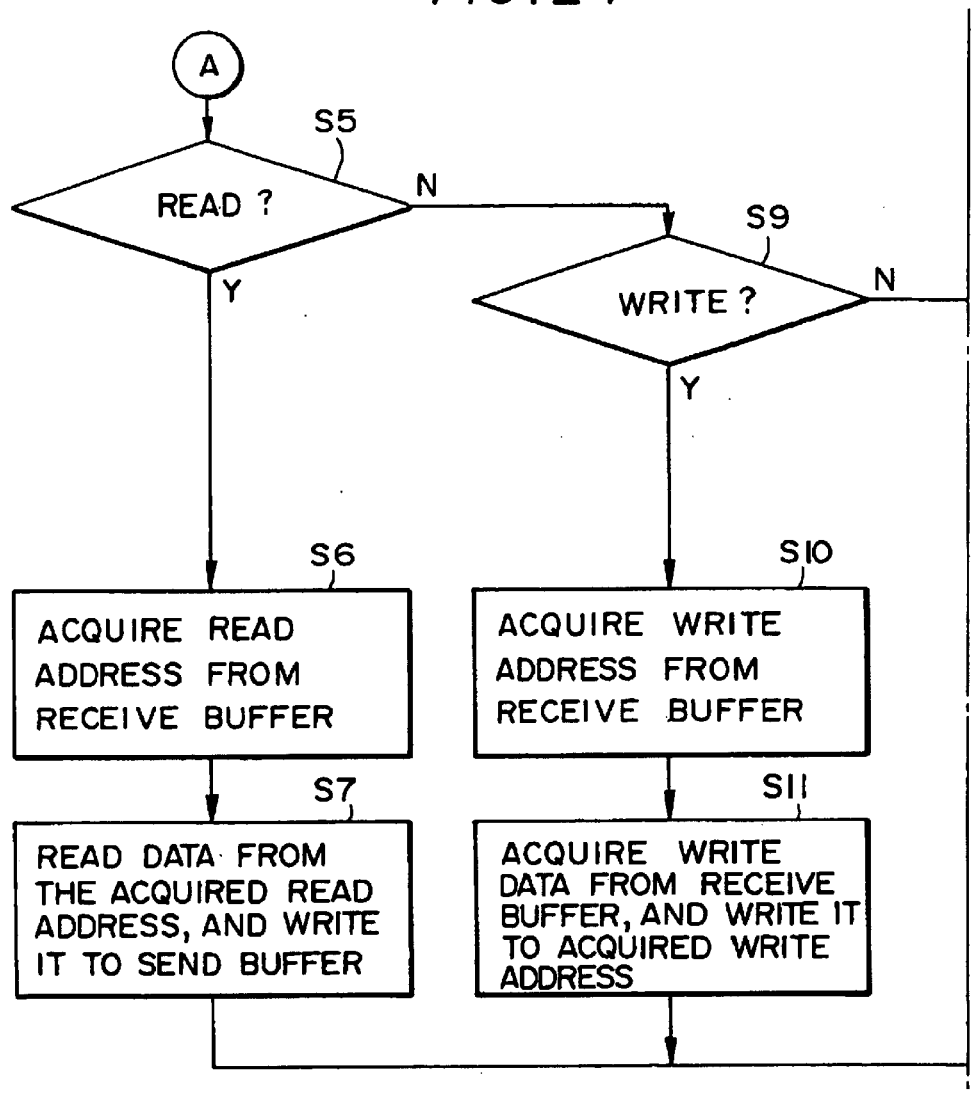
FIG. 24 is a flowchart illustrating another detailed process of this embodiment.

FIGS. 23 and 24 show flowcharts illustrating the process of the mini monitor program in the debugging mode.

After shifted to the debugging mode, the mini monitor program first saves the contents of the internal register 24 of CPU 22 of FIG. 3 in the mini monitor RAM 44 (step S1). The mini monitor program then sets the control register 46 which is used by this program (step S2).

14-byte data received from the debugging tool 60 is written into the receive buffer 74 (see FIG. 6) (step S3). The first one byte of data in the receive buffer 74 (command identifying data ID) is checked (step S4).

As shown in FIG. 24, if ID represents a read command (see FIG. 10D), a read address is acquired from the receive buffer 74 (steps S5 and S6). The data is then read from the acquired read address and is written to the send buffer 72 (step S7). The data in the send buffer 72 is then sent to the debugging tool 60 (step S8). Subsequently, the processing returns to the step S3 of FIG. 23 and the next receive data is written to the receive buffer 74.

If ID represents write command (see FIG. 10C), a write address is acquired from the receive buffer 74 (steps S9 and S10). A write data is then acquired from the receive buffer 74 and written to the write address acquired at the step S10 (step S11).

If ID represents external routine jump command (see FIG. 11A), a routine address is acquired from the receive buffer 74 (steps S12 and S13). After the jump to the external routine, the procedure returns to the mini monitor program (step S14).

If ID represents go command (see FIG. 11B), the data saved to the mini monitor RAM 44 is restored to the internal register 24 (steps S15 and S16). As shown in FIG. 22, the procedure then returns to the user program and the debugging mode is ended (step S17).

On the other hand, if ID represents that this is neither a read, write, external routine jump nor go commands, the system judges that no process is required (steps S15 and S16). Dummy data is then written to the send buffer 72 (step S19). In FIG. 24, it is to be noted that the processing of data fill command is omitted.

In such a manner, the primitive commands obtained by conversion of the debugging commands will be executed by the mini monitor program.

12. Electronic Equipment

The description now turns to electronic equipment comprising the microcomputer of the present embodiment.

Figure 25A:
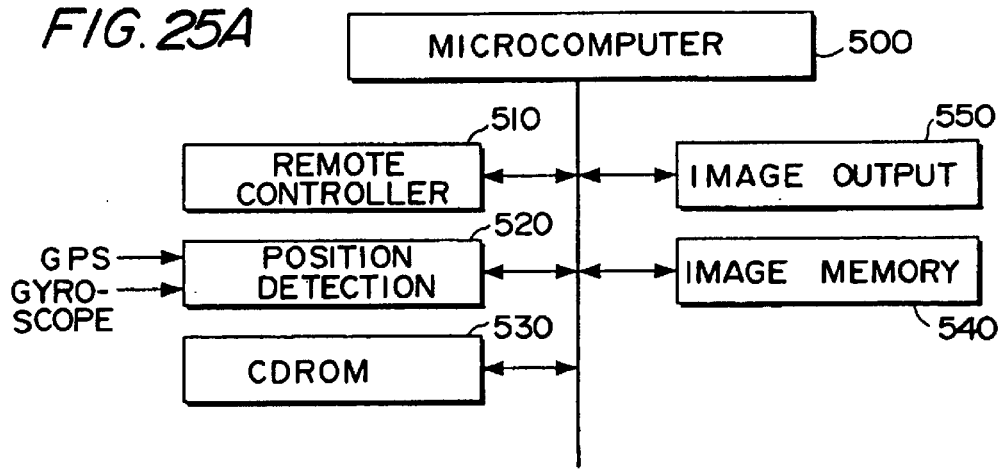
FIGS. 25A to 25C show internal block diagrams of various electronic equipment.
Figure 26A:
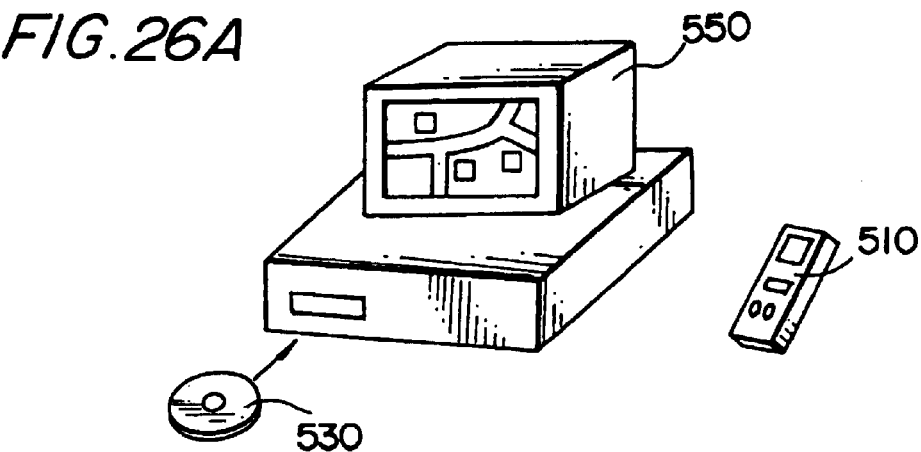
FIGS. 26A to 26C show external views of various electronic equipment.
Figure 26B:
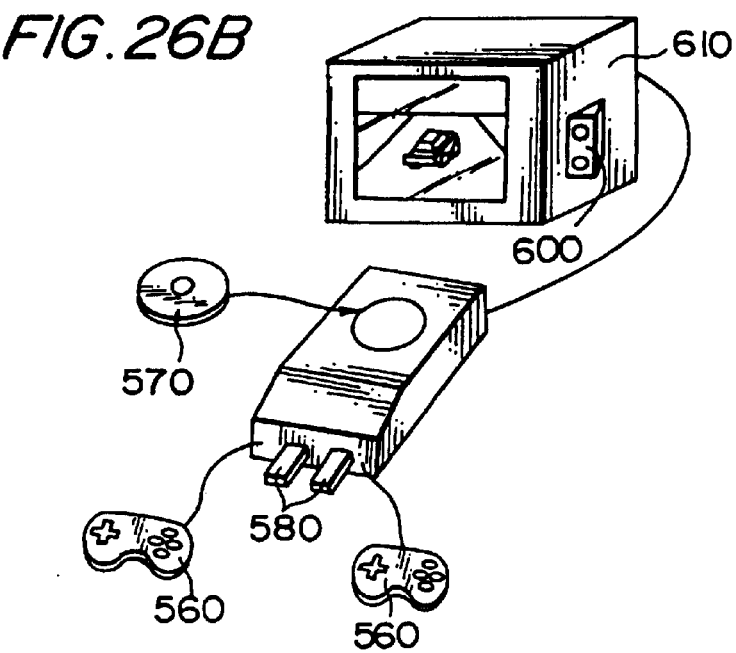

An internal block diagram of a car navigation system that is one example of such electronic equipment is shown in FIG. 25A and an external view thereof is shown in FIG. 26A. A remote controller 510 is used to operate this car navigation system and the position of the vehicle is detected by a position detection section 520 based on information from GPS or gyroscope. Maps and other information are stored in a CD-ROM 530 (information storage medium). An image memory 540 functions as a work area during image processing, and the thus generated images are displayed to the driver by an image output section 550. A microcomputer 500 inputs data from data input sources such as the remote controller 510, the position detection section 520, and the CD-ROM 530, performs various operations thereon, then uses an output device such as the image output section 550 to output the data after the processing.

Figure 25B:
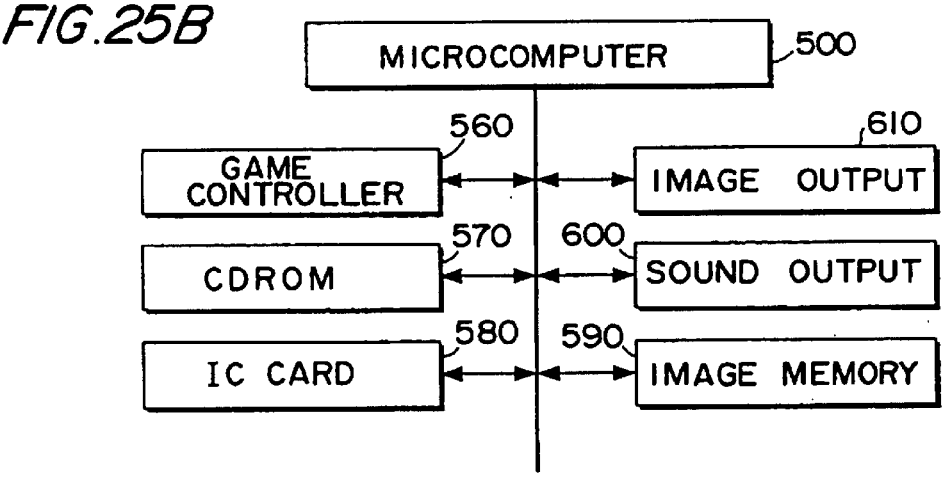

An internal block diagram of a game machine that is another example of such electronic equipment is shown in FIG. 25B and an external view thereof is shown in FIG. 26A. Using an image memory 590 as a work area, this game machine generates game images and sounds based on the player's operating information from a game controller 560, a game program from a CD-ROM 570, and player information from an IC card 580, and outputs them by using an image output section, 610 and a sound output sect ion 600.

Figure 25C:
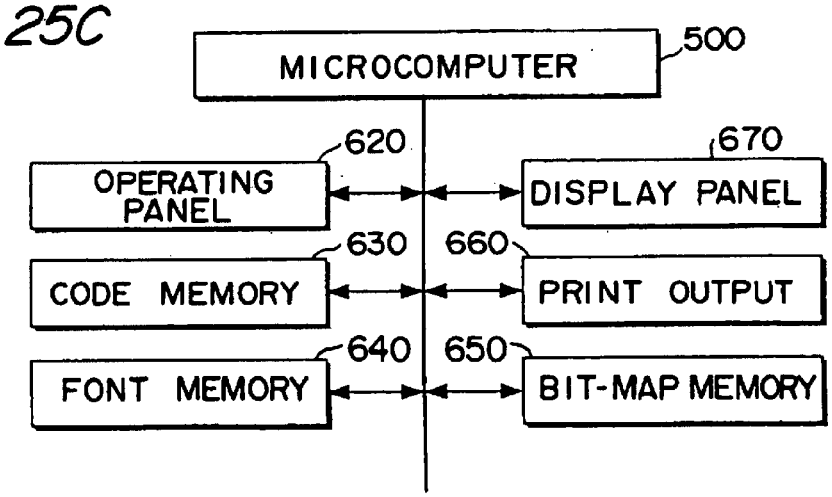
Figure 26C:
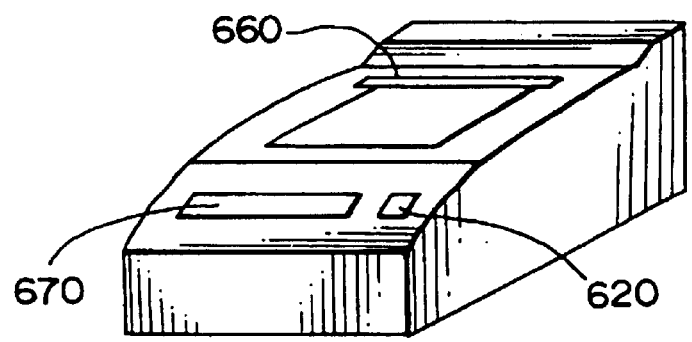

An internal block diagram of a printer that is a further example of such electronic equipment is shown in FIG. 25C and an external view thereof is shown in FIG. 26C. Using a bit map memory 650 as a work area, this printer generate print images based on operating information from an operating panel 620 and character information from a code memory 630 and font memory 640, and outputs them by using a print output section 660. A display panel 670 is used for conveying the current state and mode of the printer to the user.

The microcomputer or debugging system in accordance with the present embodiment makes it possible to simplify the development and reduce the development time of user programs that cause the operation of the items of electronic equipment shown in FIGS. 25 A to 26C. Since it also makes it possible to debug user programs in an environment that is the same as that in which the microcomputer operates, the reliability of this electronic equipment can also be increased. The hardware of the microcomputer installed into this electronic equipment can be made more compact and less expensive, leading to a reduction of the cost of the electronic equipment itself. Since the instruction code size of the mini monitor program is also small, the memory area used by the user for storing programs and various data is completely untouched thereby.

Note that the electronic equipment to which the microcomputer of the present embodiment can be applied is not limited to those described in the above examples, and thus it could be any of a portable telephone (cellular phone), a PHS, a pager, audio equipment, an electronic organizer, an electronic tabletop calculator, a POS terminal, a device provided with a touch panel, a projector, a dedicated wordprocessor, a personal computer, a television set, or a view-finder or direct monitor type of video tape recorder, by way of example.

Note also that the present invention is not limited to the embodiments described herein, and various modifications can be conceived within the scope of the invention.

For example, the primitive commands used in the illustrated embodiment may not be limited to the described forms although they are particularly desirable in the present invention.

The microcomputer and mini monitor section (first monitor means) are not limited to the illustrated forms, and may be modified or changed to any of various other forms.

The debugging system also is not limited to the form of FIG. 7.

What is claimed is:

1. A microcomputer having an on-chip debugging function, comprising:
    a central processing unit for executing instructions; and
    a first monitor section which performs data transfer to and from a second monitor section, determines a primitive command to be executed based on the receive data from said second monitor section, and performs processing for execution of the determined primitive command, said second monitor section being provided outside said microcomputer and performing a processing to convert a debugging command into at least one primitive command in order to reduce the size of an instruction code for realizing the first monitor section or a scale of the first monitor section.

2. The microcomputer according to claim 1, said primitive command includes a command for starting an execution of a user program, a command for writing data to an address on a memory map in a debugging mode and a command for reading data from the address on said memory map.

3. The microcomputer according to claim 2, the first monitor section includes a control register used for execution of instructions in said central processing unit and having an address thereof allocated on the memory map in the debugging mode.

4. The microcomputer according to claim 2, the first monitor section includes a monitor RAM into which contents of an internal register of said central processing unit are saved, and having an address thereof allocated on the memory map in the debugging mode.

5. The microcomputer according to claim 2, further comprising a terminal connected to a single bidirectional communication line for performing a half-duplex bidirectional communication between said terminal and said second monitor section,
    wherein, on condition that said first monitor section being a slave has received data from said second monitor section being a master, said first monitor section performs a processing corresponding to the received data and sends response data corresponding to the received data to said second monitor section.

6. The microcomputer according to claim 2, the data received from said second monitor section includes an identification data of the primitive command to be executed by said first monitor section.

7. The microcomputer according to claim 2, wherein said first monitor section transfers fixed-length data to and from said second monitor section.

8. The microcomputer according to claim 2, wherein a monitor program for executing a processing of said first monitor section is stored in a ROM.

9. The microcomputer according to claim 2,
    said first monitor section includes:
    a first frequency division circuit for dividing a first clock and for generating a first sampling clock for sampling each bit in data sent and received according to start-stop synchronization; and
    a circuit for sending and receiving data based on said first sampling clock, and
    wherein said first monitor section supplies said first clock to said second monitor section as a signal for causing a second frequency division circuit included in said second monitor section to generate a second sampling clock.

10. The microcomputer according to claim 2, said first monitor section includes a monitor RAM which is readable and writable, and
    when a break of an execution of an user program occurs and a mode is shifted to a debugging mode, said first monitor section saves a program counter value of said central processing unit and contents of an internal register into said monitor RAM.

11. An electronic instrument, comprising:
    a microcomputer according to claim 2;
    an input source of data to be processed by said microcomputer; and
    an output device for outputting data processed by said microcomputer.

12. The microcomputer according to claim 1, the first monitor section includes a control register used for execution of instructions in said central processing unit and having an address thereof allocated on a memory map in a debugging mode.

13. An electronic instrument, comprising:
a microcomputer according to claim 12;
an input source of data to be processed by said microcomputer; and
an output device for outputting data processed by said microcomputer.

14. The microcomputer according to claim 1, the first monitor section includes a monitor RAM into which contents of an internal register of said central processing unit are saved, and having an address thereof allocated on a memory map in a debugging mode.

15. An electronic instrument, comprising:
a microcomputer according to claim 14;
an input source of data to be processed by said microcomputer; and
an output device for outputting data processed by said microcomputer.

16. The microcomputer according to claim 1, further comprising a terminal connected to a single bidirectional communication line for performing a half-duplex bidirectional communication between said terminal and said second monitor section,
wherein, on condition that said first monitor section being a slave has received data from said second monitor section being a master, said first monitor section performs a processing corresponding to the received data and sends response data corresponding to the received data to said second monitor section.

17. An electronic instrument, comprising:
a microcomputer according to claim 16;
an input source of data to be processed by said microcomputer; and
an output device for outputting data processed by said microcomputer.

18. The microcomputer according to claim 1, the data received from said second monitor section includes an identification data of the primitive command to be executed by said first monitor section.

19. An electronic instrument, comprising:
a microcomputer according to claim 18;
an input source of data to be processed by said microcomputer; and
an output device for outputting data processed by said microcomputer.

20. The microcomputer according to claim 1, wherein said first monitor section transfers fixed-length data to and from said second monitor section.

21. An electronic instrument, comprising:
a microcomputer according to claim 20;
an input source of data to be processed by said microcomputer; and
an output device for outputting data processed by said microcomputer.

22. The microcomputer according to claim 1, wherein a monitor program for executing a processing of said first monitor section is stored in a ROM.

23. An electronic instrument, comprising:
a microcomputer according to claim 22;
an input source of data to be processed by said microcomputer; and
an output device for outputting data processed by said microcomputer.

24. The microcomputer according to claim 1,
said first monitor section includes a monitor RAM which is readable and writable, and
when a break of an execution of an user program occurs and a mode is shifted to a debugging mode, said first monitor section saves a program counter value of said central processing unit and contents of an internal register into said monitor RAM.

25. An electronic instrument, comprising:
a microcomputer according to claim 24;
an input source of data to be processed by said microcomputer; and
an output device for outputting data processed by said microcomputer.

26. An electronic instrument, comprising:
a microcomputer according to claim 1;
an input source of data to be processed by said microcomputer; and
an output device for outputting data processed by said microcomputer.

27. An electronic instrument, comprising:
a microcomputer according to claim 22;
an input source of data to be processed by said microcomputer; and
an output device for outputting data processed by said microcomputer.

28. A debugging system for a target system including a microcomputer, said debugging system comprising:
a second monitor section which performs processing for converting a debugging command issued by a host system into at least one primitive command; and
a first monitor section which performs data transfer to and from said second monitor section, determines a primitive command to be executed based on the receive data from said second monitor section, and performs processing for execution of the determined primitive command, wherein the second monitor section converts the debugging command into the primitive command in order to reduce the size of an instruction code for realizing the first monitor section or a scale of the first monitor section.

29. The debugging system according to claim 28, said primitive command includes a command for starting an execution of a user program, a command for writing data to an address on a memory map in a debugging mode and a command for reading data from the address on said memory map.

30. The debugging system according to claim 28, the first monitor section includes a control register used for execution of instructions in said central processing unit and having an address thereof allocated on a memory map in a debugging mode.

31. The debugging system according to claim 28, the first monitor section includes a monitor RAM into which contents of an internal register of said central processing unit are saved, and having an address thereof allocated on a memory map in a debugging mode.

32. The debugging system according to claim 28, further comprising a terminal connected to a single bidirectional communication line for performing a half-duplex bidirectional communication between said terminal and said second monitor section, wherein, on condition that said first monitor section being a slave has received data from said second monitor section being a master, said first monitor section performs a processing corresponding to the received data and sends response data corresponding to the received data to said second monitor section.

33. The debugging system according to claim 28, the data received from said second monitor section includes an identification data of the primitive command to be executed by said first monitor section.

34. The debugging system according to claim 28, wherein said first monitor section transfers fixed-length data to and from said second monitor section.

35. The debugging system according to claim 28, wherein a monitor program for executing a processing of said first monitor section is stored in a ROM.

36. The debugging system according to claim 28, said first monitor section includes:

a first frequency division circuit for dividing a first clock and for generating a first sampling clock for sampling each bit in data sent and received according to start-stop synchronization; and a circuit for sending and receiving data based on said first sampling clock, and wherein said first monitor section supplies said first clock to said second monitor section as a signal for causing a second frequency division circuit included in said second monitor section to generate a second sampling clock.

* * * * *

UNITED STATES PATENT AND TRADEMARK OFFICE
CERTIFICATE OF CORRECTION

| | | |
|---|---|---|
| PATENT NO. | : 7,100,086 B1 | |
| APPLICATION NO. | : 09/424667 | |
| DATED | : August 29, 2006 | |
| INVENTOR(S) | : Kudo et al. | |

It is certified that error appears in the above-identified patent and that said Letters Patent is hereby corrected as shown below:

Delete claims 1-36 and insert claims 1-36 as shown:

--1. A microcomputer having an on-chip debugging function, comprising:
a central processing unit for executing instructions; and
a first monitor section which performs data transfer to and from a second monitor section, determines a primitive command to be executed based on the receive data from said second monitor section, and performs processing for execution of the determined primitive command, said second monitor section being provided outside said microcomputer and performing a processing to convert a debugging command into at least one primitive command in order to reduce the size of an instruction code for realizing the first monitor section or a scale of the first monitor section, said first monitor section includes a first frequency division circuit for dividing a first clock and for generating a first sampling clock for sampling each bit in data sent and received according to start-stop synchronization, and a circuit for sending and receiving data based on said first sampling clock, said first monitor section supplies said first clock to said second monitor section as a signal for causing a second frequency division circuit included in said second monitor section to generate a second sampling clock.

2. The microcomputer according to claim 1, said primitive command includes a command for starting an execution of a user program, a command for writing data to an address on a memory map in a debugging mode and a command for reading data from the address on said memory map.

3. The microcomputer according to claim 2, the first monitor section includes a control register used for execution of instructions in said central processing unit and having an address thereof allocated on the memory map in the debugging mode.

4. The microcomputer according to claim 2, the first monitor section includes a monitor RAM into which contents of an internal register of said central processing unit are saved, and having an address thereof allocated on the memory map in the debugging mode.

UNITED STATES PATENT AND TRADEMARK OFFICE
CERTIFICATE OF CORRECTION

| | |
|---|---|
| PATENT NO. | : 7,100,086 B1 |
| APPLICATION NO. | : 09/424667 |
| DATED | : August 29, 2006 |
| INVENTOR(S) | : Kudo et al. |

It is certified that error appears in the above-identified patent and that said Letters Patent is hereby corrected as shown below:

5. The microcomputer according to claim 2, further comprising a terminal connected to a single bidirectional communication line for performing a half-duplex bidirectional communication between said terminal and said second monitor section, wherein, on condition that said first monitor section being a slave has received data from said second monitor section being a master, said first monitor section performs a processing corresponding to the received data and sends response data corresponding to the received data to said second monitor section.

6. The microcomputer according to claim 2, the data received from said second monitor section includes an identification data of the primitive command to be executed by said first monitor section.

7. The microcomputer according to claim 2, wherein said first monitor section transfers fixed-length data to and from said second monitor section.

8. The microcomputer according to claim 2, wherein a monitor program for executing a processing of said first monitor section is stored in a ROM.

9. The microcomputer according to claim 2, said first monitor section includes:
    a first frequency division circuit for dividing a first clock and for generating a first sampling clock for sampling each bit in data sent and received according to start-stop synchronization; and
    a circuit for sending and receiving data based on said first sampling clock, and
    wherein said first monitor section supplies said first clock to said second monitor section as a signal for causing a second frequency division circuit included in said second monitor section to generate a second sampling clock.

10. The microcomputer according to claim 2, said first monitor section includes a monitor RAM which is readable and writable, and when a break of an execution of an user program occurs and a mode is shifted to a debugging mode, said first monitor section saves a program counter value of said central processing unit and contents of an internal register into said monitor RAM.

UNITED STATES PATENT AND TRADEMARK OFFICE
CERTIFICATE OF CORRECTION

PATENT NO. : 7,100,086 B1
APPLICATION NO. : 09/424667
DATED : August 29, 2006
INVENTOR(S) : Kudo et al.

It is certified that error appears in the above-identified patent and that said Letters Patent is hereby corrected as shown below:

11. An electronic instrument, comprising:
a microcomputer according to claim 2;
an input source of data to be processed by said microcomputer; and
an output device for outputting data processed by said microcomputer.

12. The microcomputer according to claim 1, the first monitor section includes a control register used for execution of instructions in said central processing unit and having an address thereof allocated on a memory map in a debugging mode.

13. An electronic instrument, comprising:
a microcomputer according to claim 12;
an input source of data to be processed by said microcomputer; and
an output device for outputting data processed by said microcomputer.

14. The microcomputer according to claim 1, the first monitor section includes a monitor RAM into which contents of an internal register of said central processing unit are saved, and having an address thereof allocated on a memory map in a debugging mode.

15. An electronic instrument, comprising:
a microcomputer according to claim 14;
an input source of data to be processed by said microcomputer; and
an output device for outputting data processed by said microcomputer.

16. The microcomputer according to claim 1, further comprising a terminal connected to a single bidirectional communication line for performing a half-duplex bidirectional communication between said terminal and said second monitor section, wherein, on condition that said first monitor section being a slave has received data from said second monitor section being a master, said first monitor section performs a processing corresponding to the received data and sends response data corresponding to the received data to said second monitor section.

UNITED STATES PATENT AND TRADEMARK OFFICE
CERTIFICATE OF CORRECTION

| | |
|---|---|
| PATENT NO. | : 7,100,086 B1 |
| APPLICATION NO. | : 09/424667 |
| DATED | : August 29, 2006 |
| INVENTOR(S) | : Kudo et al. |

It is certified that error appears in the above-identified patent and that said Letters Patent is hereby corrected as shown below:

17. An electronic instrument, comprising:
a microcomputer according to claim 16;
an input source of data to be processed by said microcomputer; and
an output device for outputting data processed by said microcomputer.

18. The microcomputer according to claim 1, the data received from said second monitor section includes an identification data of the primitive command to be executed by said first monitor section.

19. An electronic instrument, comprising:
a microcomputer according to claim 18;
an input source of data to be processed by said microcomputer; and
an output device for outputting data processed by said microcomputer.

20. The microcomputer according to claim 1, wherein said first monitor section transfers fixed-length data to and from said second monitor section.

21. An electronic instrument, comprising:
a microcomputer according to claim 20;
an input source of data to be processed by said microcomputer; and
an output device for outputting data processed by said microcomputer.

22. The microcomputer according to claim 1, wherein a monitor program for executing a processing of said first monitor section is stored in a ROM.

23. An electronic instrument, comprising:
a microcomputer according to claim 22;
an input source of data to be processed by said microcomputer; and
an output device for outputting data processed by said microcomputer.

24. The microcomputer according to claim 1, said first monitor section includes a monitor RAM which is readable and writable, and when a break of an execution of an user program occurs and a mode is shifted to a debugging mode, said first monitor section saves a program counter value of said central processing unit and contents of an internal register into said monitor RAM.

UNITED STATES PATENT AND TRADEMARK OFFICE
CERTIFICATE OF CORRECTION

| | | |
|---|---|---|
| PATENT NO. | : 7,100,086 B1 | |
| APPLICATION NO. | : 09/424667 | |
| DATED | : August 29, 2006 | |
| INVENTOR(S) | : Kudo et al. | |

It is certified that error appears in the above-identified patent and that said Letters Patent is hereby corrected as shown below:

25. An electronic instrument, comprising:
a microcomputer according to claim 24;
an input source of data to be processed by said microcomputer; and
an output device for outputting data processed by said microcomputer.

26. An electronic instrument, comprising:
a microcomputer according to claim 1;
an input source of data to be processed by said microcomputer; and
an output device for outputting data processed by said microcomputer.

27. An electronic instrument, comprising:
a microcomputer according to claim 1;
an input source of data to be processed by said microcomputer; and
an output device for outputting data processed by said microcomputer.

28. A debugging system for a target system including a microcomputer, said debugging system comprising:
a second monitor section which performs processing for converting a debugging command issued by a host system into at least one primitive command; and
a first monitor section which performs data transfer to and from said second monitor section, determines a primitive command to be executed based on the receive data from said second monitor section, and performs processing for execution of the determined primitive command, wherein the second monitor section converts the debugging command into the primitive command in order to reduce the size of an instruction code for realizing the first monitor section or a scale of the first monitor section, said first monitor section includes a first frequency division circuit for dividing a first clock and for generating a first sampling clock for sampling each bit in data sent and received according to start-stop synchronization, and a circuit for sending and receiving data based on said first sampling clock, said first monitor section supplies said first clock to said second monitor section as a signal for causing a second frequency division circuit included in said second monitor section to generate a second sampling clock.

UNITED STATES PATENT AND TRADEMARK OFFICE
CERTIFICATE OF CORRECTION

| | | |
|---|---|---|
| PATENT NO. | : 7,100,086 B1 | |
| APPLICATION NO. | : 09/424667 | |
| DATED | : August 29, 2006 | |
| INVENTOR(S) | : Kudo et al. | |

It is certified that error appears in the above-identified patent and that said Letters Patent is hereby corrected as shown below:

29. The debugging system according to claim 28, said primitive command includes a command for starting an execution of a user program, a command for writing data to an address on a memory map in a debugging mode and a command for reading data from the address on said memory map.

30. The debugging system according to claim 28, the first monitor section includes a control register used for execution of instructions in said central processing unit and having an address thereof allocated on a memory map in a debugging mode.

31. The debugging system according to claim 28, the first monitor section includes a monitor RAM into which contents of an internal register of said central processing unit are saved, and having an address thereof allocated on a memory map in a debugging mode.

32. The debugging system according to claim 28, further comprising a terminal connected to a single bidirectional communication line for performing a half-duplex bidirectional communication between said terminal and said second monitor section, wherein, on condition that said first monitor section being a slave has received data from said second monitor section being a master, said first monitor section performs a processing corresponding to the received data and sends response data corresponding to the received data to said second monitor section.

33. The debugging system according to claim 28, the data received from said second monitor section includes an identification data of the primitive command to be executed by said first monitor section.

34. The debugging system according to claim 28, wherein said first monitor section transfers fixed-length data to and from said second monitor section.

35. The debugging system according to claim 28, wherein a monitor program for executing a processing of said first monitor section is stored in a ROM.

UNITED STATES PATENT AND TRADEMARK OFFICE
CERTIFICATE OF CORRECTION

PATENT NO. : 7,100,086 B1
APPLICATION NO. : 09/424667
DATED : August 29, 2006
INVENTOR(S) : Kudo et al.

It is certified that error appears in the above-identified patent and that said Letters Patent is hereby corrected as shown below:

36. The debugging system according to claim 28, said first monitor section includes:

a first frequency division circuit for dividing a first clock and for generating a first sampling clock for sampling each bit in data sent and received according to start-stop synchronization; and a circuit for sending and receiving data based on said first sampling clock, and wherein said first monitor section supplies said first clock to said second monitor section as a signal for causing a second frequency division circuit included in said second monitor section to generate a second sampling clock.--

Signed and Sealed this

Ninth Day of June, 2009

JOHN DOLL
*Acting Director of the United States Patent and Trademark Office*

UNITED STATES PATENT AND TRADEMARK OFFICE
CERTIFICATE OF CORRECTION

| | |
|---|---|
| PATENT NO. | : 7,100,086 B1 |
| APPLICATION NO. | : 09/424667 |
| DATED | : August 29, 2006 |
| INVENTOR(S) | : Kudo et al. |

It is certified that error appears in the above-identified patent and that said Letters Patent is hereby corrected as shown below:

Column 17, line 54 thru Column 22, line 10:
Delete claims 1-36 and insert claims 1-36 as shown:

--1.  A microcomputer having an on-chip debugging function, comprising:
a central processing unit for executing instructions; and
a first monitor section which performs data transfer to and from a second monitor section, determines a primitive command to be executed based on the receive data from said second monitor section, and performs processing for execution of the determined primitive command, said second monitor section being provided outside said microcomputer and performing a processing to convert a debugging command into at least one primitive command in order to reduce the size of an instruction code for realizing the first monitor section or a scale of the first monitor section, said first monitor section includes a first frequency division circuit for dividing a first clock and for generating a first sampling clock for sampling each bit in data sent and received according to start-stop synchronization, and a circuit for sending and receiving data based on said first sampling clock, said first monitor section supplies said first clock to said second monitor section as a signal for causing a second frequency division circuit included in said second monitor section to generate a second sampling clock.

2.  The microcomputer according to claim 1, said primitive command includes a command for starting an execution of a user program, a command for writing data to an address on a memory map in a debugging mode and a command for reading data from the address on said memory map.

3.  The microcomputer according to claim 2, the first monitor section includes a control register used for execution of instructions in said central processing unit and having an address thereof allocated on the memory map in the debugging mode.

4.  The microcomputer according to claim 2, the first monitor section includes a monitor RAM into which contents of an internal register of said central processing unit are saved, and having an address thereof allocated on the memory map in the debugging mode.

UNITED STATES PATENT AND TRADEMARK OFFICE
CERTIFICATE OF CORRECTION

| | |
|---|---|
| PATENT NO. | : 7,100,086 B1 |
| APPLICATION NO. | : 09/424667 |
| DATED | : August 29, 2006 |
| INVENTOR(S) | : Kudo et al. |

It is certified that error appears in the above-identified patent and that said Letters Patent is hereby corrected as shown below:

5.     The microcomputer according to claim 2, further comprising a terminal connected to a single bidirectional communication line for performing a half-duplex bidirectional communication between said terminal and said second monitor section, wherein, on condition that said first monitor section being a slave has received data from said second monitor section being a master, said first monitor section performs a processing corresponding to the received data and sends response data corresponding to the received data to said second monitor section.

6.     The microcomputer according to claim 2, the data received from said second monitor section includes an identification data of the primitive command to be executed by said first monitor section.

7.     The microcomputer according to claim 2, wherein said first monitor section transfers fixed-length data to and from said second monitor section.

8.     The microcomputer according to claim 2, wherein a monitor program for executing a processing of said first monitor section is stored in a ROM.

9.     The microcomputer according to claim 2, said first monitor section includes:
          a first frequency division circuit for dividing a first clock and for generating a first sampling clock for sampling each bit in data sent and received according to start-stop synchronization; and
          a circuit for sending and receiving data based on said first sampling clock, and
          wherein said first monitor section supplies said first clock to said second monitor section as a signal for causing a second frequency division circuit included in said second monitor section to generate a second sampling clock.

10.     The microcomputer according to claim 2, said first monitor section includes a monitor RAM which is readable and writable, and when a break of an execution of an user program occurs and a mode is shifted to a debugging mode, said first monitor section saves a program counter value of said central processing unit and contents of an internal register into said monitor RAM.

UNITED STATES PATENT AND TRADEMARK OFFICE
CERTIFICATE OF CORRECTION

PATENT NO. : 7,100,086 B1
APPLICATION NO. : 09/424667
DATED : August 29, 2006
INVENTOR(S) : Kudo et al.

It is certified that error appears in the above-identified patent and that said Letters Patent is hereby corrected as shown below:

11. An electronic instrument, comprising:
a microcomputer according to claim 2;
an input source of data to be processed by said microcomputer; and
an output device for outputting data processed by said microcomputer.

12. The microcomputer according to claim 1, the first monitor section includes a control register used for execution of instructions in said central processing unit and having an address thereof allocated on a memory map in a debugging mode.

13. An electronic instrument, comprising:
a microcomputer according to claim 12;
an input source of data to be processed by said microcomputer; and
an output device for outputting data processed by said microcomputer.

14. The microcomputer according to claim 1, the first monitor section includes a monitor RAM into which contents of an internal register of said central processing unit are saved, and having an address thereof allocated on a memory map in a debugging mode.

15. An electronic instrument, comprising:
a microcomputer according to claim 14;
an input source of data to be processed by said microcomputer; and
an output device for outputting data processed by said microcomputer.

16. The microcomputer according to claim 1, further comprising a terminal connected to a single bidirectional communication line for performing a half-duplex bidirectional communication between said terminal and said second monitor section, wherein, on condition that said first monitor section being a slave has received data from said second monitor section being a master, said first monitor section performs a processing corresponding to the received data and sends response data corresponding to the received data to said second monitor section.

UNITED STATES PATENT AND TRADEMARK OFFICE
CERTIFICATE OF CORRECTION

| | |
|---|---|
| PATENT NO. | : 7,100,086 B1 |
| APPLICATION NO. | : 09/424667 |
| DATED | : August 29, 2006 |
| INVENTOR(S) | : Kudo et al. |

It is certified that error appears in the above-identified patent and that said Letters Patent is hereby corrected as shown below:

17. An electronic instrument, comprising:
a microcomputer according to claim 16;
an input source of data to be processed by said microcomputer; and
an output device for outputting data processed by said microcomputer.

18. The microcomputer according to claim 1, the data received from said second monitor section includes an identification data of the primitive command to be executed by said first monitor section.

19. An electronic instrument, comprising:
a microcomputer according to claim 18;
an input source of data to be processed by said microcomputer; and
an output device for outputting data processed by said microcomputer.

20. The microcomputer according to claim 1, wherein said first monitor section transfers fixed-length data to and from said second monitor section.

21. An electronic instrument, comprising:
a microcomputer according to claim 20;
an input source of data to be processed by said microcomputer; and
an output device for outputting data processed by said microcomputer.

22. The microcomputer according to claim 1, wherein a monitor program for executing a processing of said first monitor section is stored in a ROM.

23. An electronic instrument, comprising:
a microcomputer according to claim 22;
an input source of data to be processed by said microcomputer; and
an output device for outputting data processed by said microcomputer.

24. The microcomputer according to claim 1, said first monitor section includes a monitor RAM which is readable and writable, and when a break of an execution of an user program occurs and a mode is shifted to a debugging mode, said first monitor section saves a program counter value of said central processing unit and contents of an internal register into said monitor RAM.

UNITED STATES PATENT AND TRADEMARK OFFICE
CERTIFICATE OF CORRECTION

| | |
|---|---|
| PATENT NO. | : 7,100,086 B1 |
| APPLICATION NO. | : 09/424667 |
| DATED | : August 29, 2006 |
| INVENTOR(S) | : Kudo et al. |

It is certified that error appears in the above-identified patent and that said Letters Patent is hereby corrected as shown below:

25.    An electronic instrument, comprising:
a microcomputer according to claim 24;
an input source of data to be processed by said microcomputer; and
an output device for outputting data processed by said microcomputer.

26.    An electronic instrument, comprising:
a microcomputer according to claim 1;
an input source of data to be processed by said microcomputer; and
an output device for outputting data processed by said microcomputer.

27.    An electronic instrument, comprising:
a microcomputer according to claim 1;
an input source of data to be processed by said microcomputer; and
an output device for outputting data processed by said microcomputer.

28.    A debugging system for a target system including a microcomputer, said debugging system comprising:
a second monitor section which performs processing for converting a debugging command issued by a host system into at least one primitive command; and
a first monitor section which performs data transfer to and from said second monitor section, determines a primitive command to be executed based on the receive data from said second monitor section, and performs processing for execution of the determined primitive command, wherein the second monitor section converts the debugging command into the primitive command in order to reduce the size of an instruction code for realizing the first monitor section or a scale of the first monitor section, said first monitor section includes a first frequency division circuit for dividing a first clock and for generating a first sampling clock for sampling each bit in data sent and received according to start-stop synchronization, and a circuit for sending and receiving data based on said first sampling clock, said first monitor section supplies said first clock to said second monitor section as a signal for causing a second frequency division circuit included in said second monitor section to generate a second sampling clock.

UNITED STATES PATENT AND TRADEMARK OFFICE
CERTIFICATE OF CORRECTION

| | |
|---|---|
| PATENT NO. | : 7,100,086 B1 |
| APPLICATION NO. | : 09/424667 |
| DATED | : August 29, 2006 |
| INVENTOR(S) | : Kudo et al. |

It is certified that error appears in the above-identified patent and that said Letters Patent is hereby corrected as shown below:

29. The debugging system according to claim 28, said primitive command includes a command for starting an execution of a user program, a command for writing data to an address on a memory map in a debugging mode and a command for reading data from the address on said memory map.

30. The debugging system according to claim 28, the first monitor section includes a control register used for execution of instructions in said central processing unit and having an address thereof allocated on a memory map in a debugging mode.

31. The debugging system according to claim 28, the first monitor section includes a monitor RAM into which contents of an internal register of said central processing unit are saved, and having an address thereof allocated on a memory map in a debugging mode.

32. The debugging system according to claim 28, further comprising a terminal connected to a single bidirectional communication line for performing a half-duplex bidirectional communication between said terminal and said second monitor section, wherein, on condition that said first monitor section being a slave has received data from said second monitor section being a master, said first monitor section performs a processing corresponding to the received data and sends response data corresponding to the received data to said second monitor section.

33. The debugging system according to claim 28, the data received from said second monitor section includes an identification data of the primitive command to be executed by said first monitor section.

34. The debugging system according to claim 28, wherein said first monitor section transfers fixed-length data to and from said second monitor section.

35. The debugging system according to claim 28, wherein a monitor program for executing a processing of said first monitor section is stored in a ROM.

UNITED STATES PATENT AND TRADEMARK OFFICE
CERTIFICATE OF CORRECTION

PATENT NO. : 7,100,086 B1
APPLICATION NO. : 09/424667
DATED : August 29, 2006
INVENTOR(S) : Kudo et al.

It is certified that error appears in the above-identified patent and that said Letters Patent is hereby corrected as shown below:

36.  The debugging system according to claim 28, said first monitor section includes:
a first frequency division circuit for dividing a first clock and for generating a first sampling clock for sampling each bit in data sent and received according to start-stop synchronization; and
a circuit for sending and receiving data based on said first sampling clock, and
wherein said first monitor section supplies said first clock to said second monitor section as a signal for causing a second frequency division circuit included in said second monitor section to generate a second sampling clock.--

This certificate supersedes the Certificate of Correction issued June 9, 2009.

Signed and Sealed this

Seventh Day of July, 2009

JOHN DOLL
*Acting Director of the United States Patent and Trademark Office*